US005755028A

United States Patent [19]

Takami et al.

[11] Patent Number: 5,755,028

[45] Date of Patent: May 26, 1998

[54] PROCESS FOR PRODUCING ENGINE CYLINDER BLOCKS

[75] Inventors: Toshihiro Takami, Toyota; Mitsuhiro Karaki, Okazaki, both of Japan

[73] Assignee: Toyota Jidosha Kabushiki Kaisha, Toyota, Japan

[21] Appl. No.: 640,653

[22] Filed: May 1, 1996

[30] Foreign Application Priority Data

| | | | |
|---|---|---|---|
| May 26, 1995 | [JP] | Japan | 7-128513 |
| Oct. 19, 1995 | [JP] | Japan | 7-271369 |
| Mar. 14, 1996 | [JP] | Japan | 8-058056 |

[51] Int. Cl.[6] ..... B23P 15/00

[52] U.S. Cl. ..... 29/888.02; 29/888.06

[58] Field of Search ..... 29/888.067, 888; 164/98, 108; 123/193.2

[56] References Cited

U.S. PATENT DOCUMENTS

| | | | |
|---|---|---|---|
| 4,469,060 | 9/1984 | Jordan . | |
| 4,969,263 | 11/1990 | Adams | 29/888.06 |
| 5,069,266 | 12/1991 | Nakatani et al. . | |
| 5,232,041 | 8/1993 | Kuhn | 164/98 |

FOREIGN PATENT DOCUMENTS

| | | |
|---|---|---|
| A-356227 | 2/1990 | European Pat. Off. . |
| A-3220775 | 12/1983 | Germany . |
| 59-175649U | 11/1984 | Japan . |
| 61-209763A | 9/1986 | Japan . |
| 53-21751A | 12/1993 | Japan . |

*Primary Examiner*—Irene Cuda

*Attorney, Agent, or Firm*—Kenyon & Kenyon

[57] ABSTRACT

A method for producing a cylinder block for an internal combustion engine having a sealing surface on which a gasket is mounted, a number of cylinder bores arranged side by side, each cylinder bore opening to the sealing surface, a water jacket surrounding the cylinder bores, and a cooling passage located between the cylinder bores. A liner assembly is first formed by joining a set of cylinder liners with each other side by side. At least one of the liners has a recess that forms a space located between adjacent cylinder liners when the liners are joined. A cast body having the water jacket is molded by pouring molten metal into a mold after the liner assembly is positioned in the mold. The molten metal is prevented from entering the space during the molding process. The space is communicated with the water jacket to form the cooling passage.

21 Claims, 18 Drawing Sheets

PROCESS FOR PRODUCING ENGINE CYLINDER BLOCKS

BACKGROUND OF THE INVENTION

1. Field of the Invention

The present invention relates to a process for producing a cylinder block of an engine. More particularly, the present invention relates to a process for producing a cylinder block in which the intervals between the cylinder bores are narrow and cooling water passages are formed between the cylinder bores.

2. Description of the Related Art

A cylinder block having a plurality of cylinder bores has been conventionally employed in a common engine. A cylinder head is attached with a gasket to a sealing surface of the cylinder block. A water jacket is formed to surround all of the cylinder bores, and cooling water is allowed to flow through the jacket. Since the cylinder bores are heated to a high temperature by the heat of combustion, generated when a gaseous mixture is combusted, it is essential that the cylinder bores are cooled around the periphery. For such purpose, it is preferred to provide a cooling water passage between the cylinder bores and to distribute cooling water to such passages as well as to the water jacket described above. However, in a cylinder block having relatively thin walls between the bores, it is difficult to form cooling water passages between the cylinder bores.

For example, Japanese Unexamined Patent Publication No. 61-209763 discloses a process for producing a cylinder block, in which a plurality of cylinder liners are arranged in a mold with a pipe located between each adjacent pair of cylinder liners. These liners and pipes are permanently embedded in molten metal put into the mold. Thus, cylinder bores and cooling water passages are defined by the inner circumferential surfaces of the cylinder liners and the pipes, respectively.

In Japanese Unexamined Utility Model Publication No. 59-175649, slit-shaped grooves are defined between adjacent cylinder bores on the sealing surface of the cylinder block so as to constitute the interbore cooling water passages. In another example, holes communicating with the water jacket are formed between the cylinder bores using a tool such as a drill to constitute the interbore cooling water passages. Such holes are usually referred to as drill paths.

However, it is difficult to apply the technique of defining the interbore cooling water passage with pipes in a cylinder block having very small bore-to-bore intervals (e.g. about 5 to 6 mm). More specifically, the cylinder liners should have a wall thickness of about 2 mm for adequate strength. If cylinder liners having such thickness are arranged such that the bore-to-bore intervals are 5 to 6 mm, the intervals between the outer circumferences of each two adjacent cylinder liners will be 1 to 2 mm. Meanwhile, the pipe should have a passage with a diameter of at least 1 mm so that the cooling water may pass through it. Accordingly, it is difficult to arrange pipes having passages with such diameter and to embed them by casting.

Further, in the technique where interbore cooling water passages are defined by slit-shaped grooves, the width of the sealing surface between the cylinder bores will be small. Thus, the contact area between the sealing surface and the gasket is small, and this results in an inadequate seal.

Further, in the technique where drill paths constitute the interbore cooling water passages, it is difficult to define passages with great volumes, although adequate sealing area can be obtained. This is because the orientation and the number of the holes to be drilled are limited. Accordingly, it is difficult to distribute a large amount of cooling water between the cylinder bores, and sufficient cooling cannot be achieved.

SUMMARY OF THE INVENTION

The present invention was accomplished in view of the circumstances as described above, and it is an objective of the present invention to provide a cylinder block having interbore cooling water passages through which a sufficient amount of water can be distributed even when the bore-to-bore distance is small. Furthermore, a sealing surface with a sufficient seal area is achieved.

To achieve the above objects, a method according to the present invention comprises the step of providing a plurality of cylinder liners, each having one of said cylinder bores and at least one connecting portion. A liner assembly is formed by joining said cylinder liners at their connecting portions. At least one of the connecting portions has a recess that forms a space located between the cylinder bores when the connecting portions are joined. The liner assembly is positioned in a mold. A cast body having said water jacket around said liner assembly is molded by pouring molten metal into the mold. The space is blocked to prevent said molten metal from entering the space during molding. According to the above method, a cylinder block can be produced. The cylinder block has a sealing surface on which a gasket is mounted. The cylinder bores are arranged side by side. Each cylinder bore opens to said sealing surface. The water jacket surrounds said cylinder bores, and the cooling passage is located between the cylinder bores.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

DETAILED DESCRIPTION OF THE PREFERRED EMBODIMENTS

A first embodiment of the present invention will be described below referring to FIGS. 1 to 13.

Figure 8:
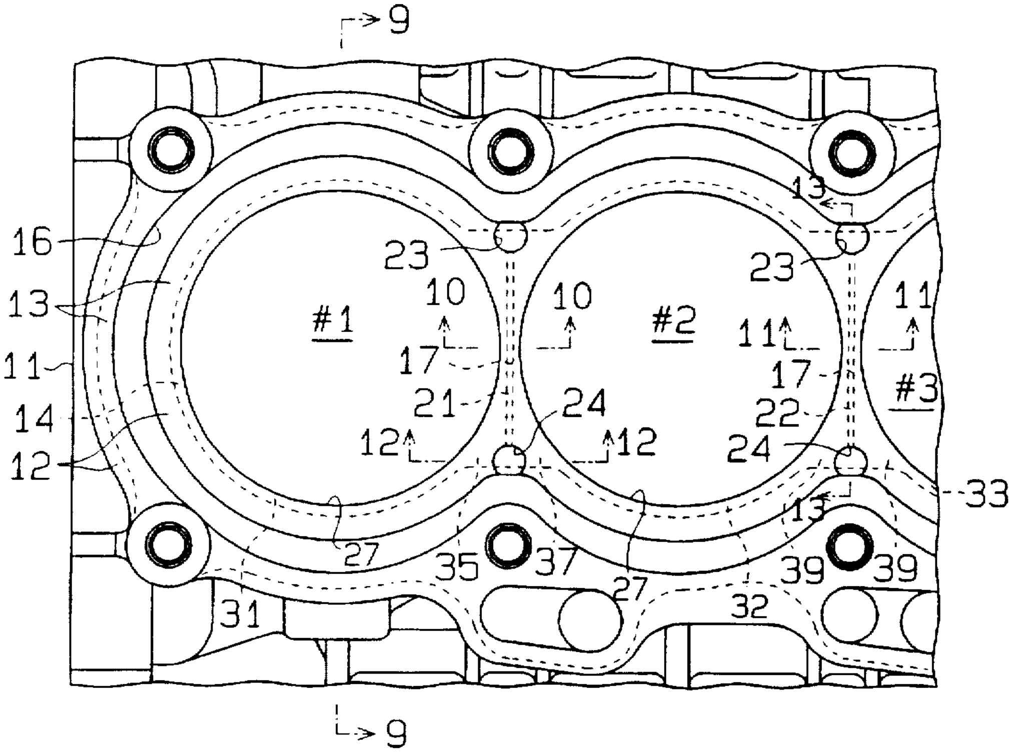
FIG. 8 is a partial plan view of a cylinder block.
Figure 9:
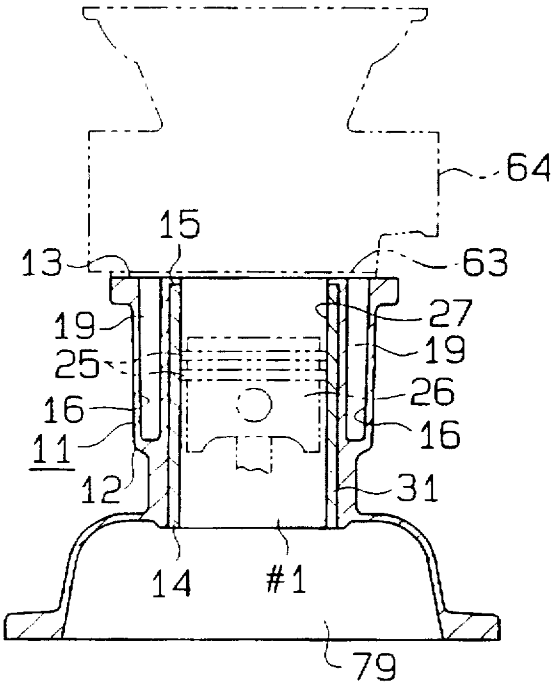
FIG. 9 is a cross-sectional view taken along the line 9—9 in FIG. 8.
Figure 11:
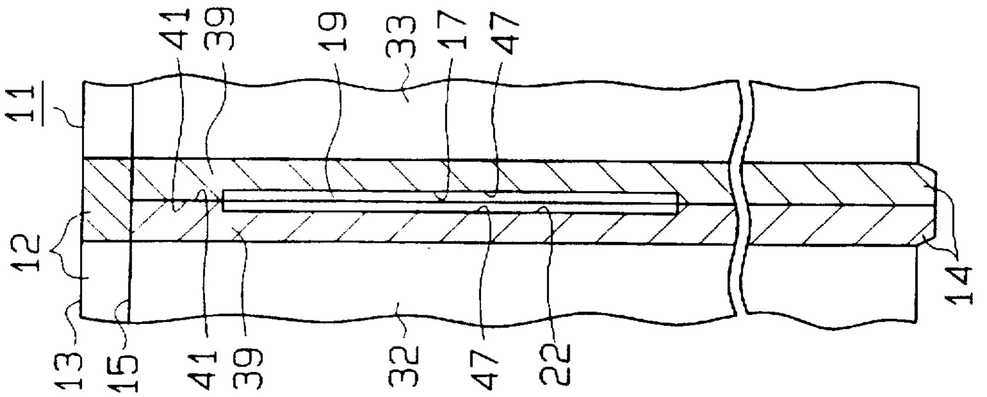
FIG. 11 is an enlarged cross-sectional view taken along the line 11—11 in FIG. 8.
Figure 10:
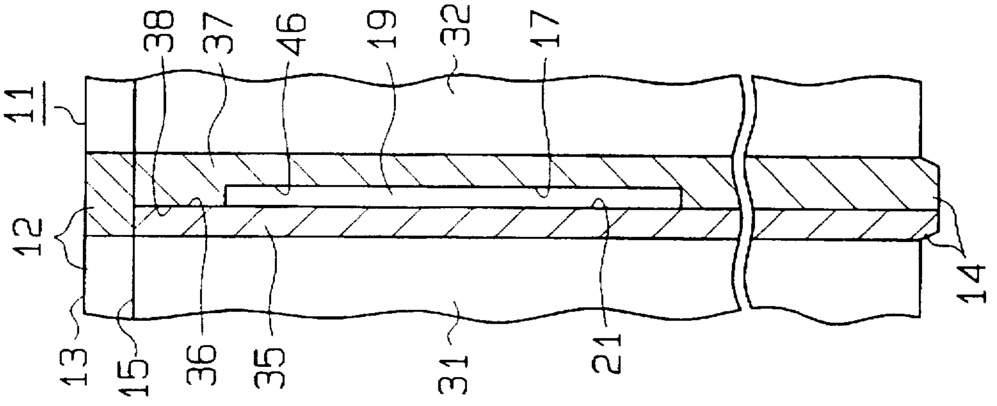
FIG. 10 is an enlarged cross-sectional view taken along the line 10—10 in FIG. 8.

FIGS. 8 and 9 show a cylinder block 11 for a four-cylinder engine produced according to the process of the present invention. The cylinder block 11 comprises a block main body 12, a liner assembly 14, a water jacket 16 and interbore cooling water passages 17. The block main body 12 is made of aluminum and is molded by means of die casting, medium-pressure molding, low-pressure molding, or the like. The block main body 12 is formed to have a flat upper face to provide a sealing surface 13 on which a gasket 63 (to be described later) is placed. The liner assembly 14 contains a group of four cylinder bores, and the assembly 14 is embedded in the block main body 12 as shown in FIG. 9.

The water jacket 16 provides a passage for cooling water 19 for cooling the block main body 12 and the liner assembly 14 and is formed around the liner assembly 14 so as to surround the group of cylinder bores. The interbore cooling water passages 17 are defined so as to introduce the cooling water 19 in the water jacket 16 between the cylinder bores. The interbore cooling water passages 17 comprise three closed spaces 21, 22 (only two spaces are shown in FIG. 8) defined at the top of the liner assembly 14 between adjacent cylinder bores and between communicating holes 23, 24, which connect the closed spaces 21, 22 to the water jacket 16.

As shown in FIGS. 10 to 13, the closed spaces 21, 22 each has a flat rectangular form, and the upper extremity of each space is positioned to be spaced downward from the upper end 15 of the liner assembly 14. The holes or passages 23, 24 are open at their tops to the sealing surface 13 of the block main body 12, at their bottoms to the closed spaces 21, 22 and at their sides to the water jacket 16.

Referring to FIGS. 8 and 9, the cylinder bore group comprises a first cylinder bore #1, a second cylinder bore #2, a third cylinder bore #3 and a fourth cylinder bore #4. Each of the cylinder bores #1, #2, #3, #4 is directed to accommodate a piston 26 having piston rings 25 such that the piston 26 may move reciprocally. The adjacent cylinder bores #1 to #4 are arranged to be spaced from one another at very close intervals of 5 to 6 mm. The upper space defined by the piston 26 in each cylinder bore #1 (#2, #3, #4) constitutes a part of combustion chamber 27 in which a gaseous mixture of fuel and air is burnt. Each of the cylinder bores #1 to #4 has a cylindrical surface with high accuracy (roundness) so as to form a proper seal against the gaseous mixture and the gas generated by combustion.

Figure 1:
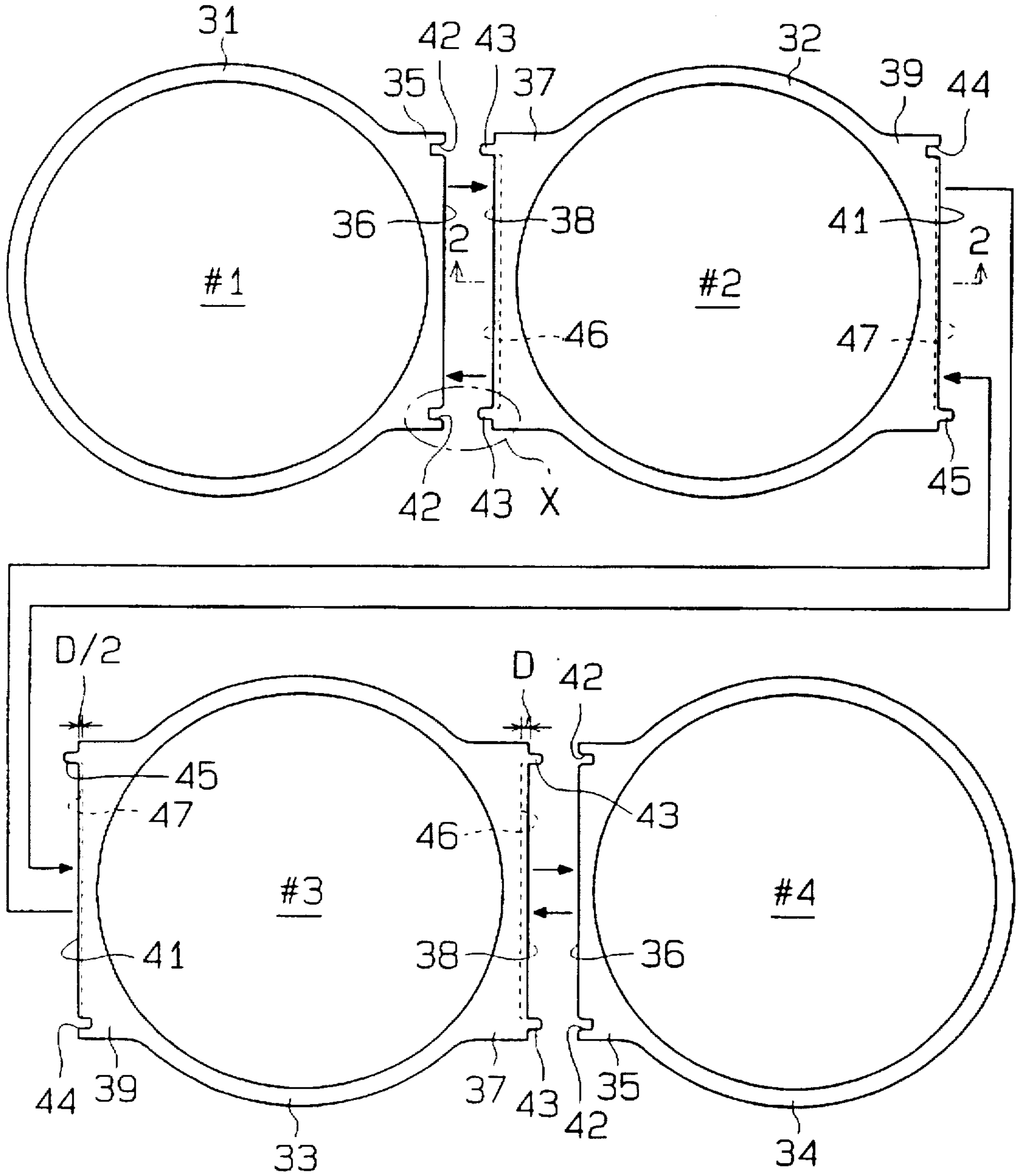
FIG. 1 is a plan view of cylinder liners according to a first embodiment of the present invention.

The liner assembly 14, as shown in FIG. 1, is constituted by arranging a first cylinder liner 31, a second cylinder liner 32, a third cylinder liner 33, and a fourth cylinder liner 34 in a line and interconnecting adjacent cylinder liners 31 through 34. These cylinder liners 31 through 34 are formed of aluminum alloy, as will be described later. The first and fourth cylinder liners 31 and 34 positioned on the opposite ends are of the same shape, and the intervening second and third cylinder liners 32 and 33 are of the same shape. In FIG. 1, the fourth cylinder liner 34 is rotated 180° with respect to the first cylinder liner 31, and the third cylinder liner 33 is rotated 180° with respect to the second cylinder liner 32. Thus, the four-part liner assembly 14 is constituted by just two cylinder liner shapes.

The first and fourth cylinder liners 31 and 34 have a generally cylindrical shape, and their inner peripheral surfaces form the first and fourth cylinder bores #1 and #4, respectively. Each of the cylinder liners 31 and 34 is provided with a single connecting portion 35 extending outward and having a flat joining surface 36 at its end portion. Also, the second and third cylinder liners 32 and 33 are in a generally cylindrical shape, and their inner peripheral surfaces form the second and third cylinder bores #2 and #3, respectively. Each of the cylinder liners 32 and 33 is provided with a pair of connecting portions 37 and 39 protruding from opposite sides of each cylinder liner and having flat joining surfaces 38 and 41 at their end portions.

In this embodiment, the following structure has been adopted in order to interconnect the four cylinder liners 31 through 34 together.

Referring to FIG. 1, on side portions of each joining surface 36 of the first and fourth cylinder liners 31 and 34, a pair of grooves 42 are formed to extend along the overall length of the cylinder liners 31 and 34. On both side portions of each joining surface 38 of the second and third cylinder liners 32 and 33, a pair of tongues 43 are formed to extend along the overall length of the cylinder liners 32 and 33. On each joining surface 41 of the second and third cylinder liners 32 and 33, a single groove 44 and a single tongue 46 are formed, one on each side, to extend along the overall length of the cylinder liners 32 and 33.

Figure 3:
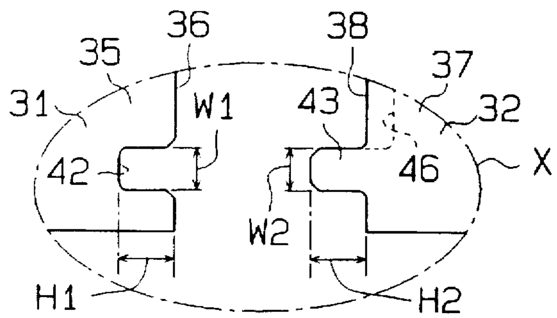
FIG. 3 is an enlarged plan view of the portion X in FIG. 1.

The tongues 43 and 45 and grooves 42 and 44 are formed so that a set of conditions are established. Referring to FIG. 3, the depth of the groove 42 (or 44) is H1, the width is W1, the height of the tongue 43 (or 45) is H2, and the width is W2. The conditions are:

$$H1>H2 \text{ and } W1<W2$$

W1<W2 is a necessary condition for the tongues 43 and 45 to be press-fitted into the grooves 42 and 44 to connect the cylinder liners 31 through 34 together. H1>H2 is a necessary condition for the joining surfaces 36, 38, and 41 to be closely contacted with each other when adjacent cylinder liners 31 through 34 are connected.

Furthermore, when the joining surfaces 36, 38, 41 of adjacent cylinder liners 31 through 34 are in contact with each other by press fitting, the closed spaces 21 and 22 constituting the interbore cooling water passages 17 are formed. The means for forming these closed spaces 21 and 22 has taken the two following points (I) and (II) into consideration:

(I) Minimization of the machining of the cylinder liners 31 through 34 in forming the closed spaces 21 and 22; and (II) Positioning of the closed spaces 21 and 22 in the center between adjacent cylinder bores #1 through #4. This is for making the distances from the cylinder bores #1 through #4 to the interbore cooling water passages 17 equal to one another for equally cooling adjacent cylinder bores.

Figure 4:
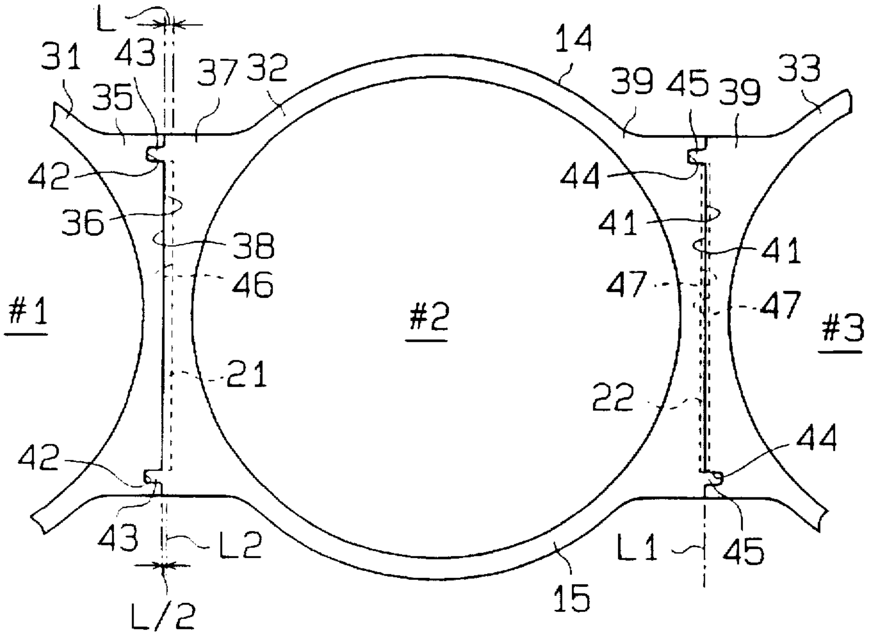
FIG. 4 is a partial plan view showing how adjacent cylinder liners are joined with each other.

More specifically, when the first and second cylinder liners 31 and 32 are interconnected as shown in FIG. 4, both of the joining surfaces 36 and 38 are shifted from an imaginary plane L2, passing halfway between the cylinder bores #1 and #2, toward the first cylinder bore #1 by half of the width L of the interbore cooling water passage 17 (closed space 21). Although not shown, as with the foregoing, when the fourth and third cylinder liners 34 and 33 are interconnected, both of the joining surfaces 36 and 38 are shifted from an imaginary plane, passing halfway between the cylinder bores #4 and #3, toward the fourth cylinder bore #4 by half of the width L. Furthermore, when the second and third cylinder liners 32 and 33 are interconnected, both of the joining surfaces 41 and 41 are positioned on an imaginary plane L1 passing halfway between the cylinder bores #2 and #3.

Figure 2:
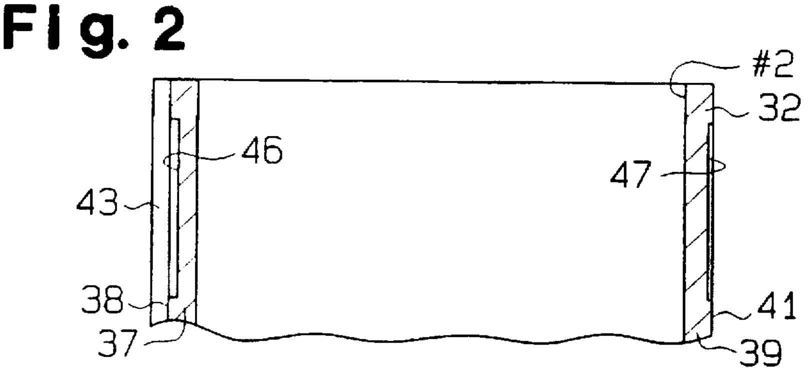
FIG. 2 is a cross-sectional view taken along the line 2—2 in FIG. 1.

As shown in FIGS. 1, 2, and 4, on the upper portions of the joining surfaces 38 of the second and third cylinder liners 32 and 33, recess portions 46 with a depth D are provided between the tongues 43. On the joining surfaces 36 of the first and fourth cylinder liners 31 and 34, such a recess portion is not provided. When the first and second cylinder liners 31 and 32 are interconnected, or when the fourth and third cylinder liners 34 and 33 are interconnected, the closed space 21 is formed by the recess portion 46 and the joining surface 36.

Furthermore, on the upper portions of the joining surfaces 41 of the second and third cylinder liners 32 and 33, recess portions 47 with a depth D/2 are provided between each groove 44 and the tongue 45 on the opposite side. When the second and third cylinder liners 32 and 33 are interconnected, the closed space 22 with a width L is formed by both recess portions 47 and 47.

The reason why the recess portions 46 and 47 are formed only in the upper portions of the joining surfaces 38 and 41 is because these portions of each bore reach the highest temperature and therefore require additional cooling beyond that provided by the cooling water 19 flowing through the water jacket 16. It is important to cool over the largest possible area. That is, as the engine operates, a fuel-air mixture burns in each combustion chamber 27. Due to the heat of the combustion, the temperature of each combustion chamber 27 and its vicinity increases. As previously described, because the space on the upper side of the piston 26 constitutes the combustion chamber 27, the temperature of the upper portions of the cylinder liners 31 through 34 becomes high. On the other hand, at greater distances downward from the combustion chamber 27, the combustion heat has lesser effect on the cylinder liner, and consequently, the lower portion can be sufficiently cooled by the cooling water 19 flowing through the water jacket 16. Thus, the lower portion of the liner 14 does not always require the interbore cooling water passages 17.

Incidentally, the aluminum cylinder liners 31 through 34 normally require the following characteristics (1) through (3):

(1) The cylinder liners have the same sliding characteristics as a cast-iron liner;

(2) The cylinder liners have enough strength and toughness to tolerate the casting pressure; and (3) The hardness of the base material of the liners is not likely to be reduced by the heat from the molten metal due to casting.

In order to satisfy the above requirements, the liner is made from base powder obtained by quench hardening and by using powder metallurgy based on hot plastic working. This results in superior characteristics such as low thermal expansion, high wear resistance, high thermal resistance and mechanical properties equal to steel or cast-iron, unlike liners made by a conventional casting elongation method.

The liner material is formed by dispersing ceramic particles such as alumina ($Al_2O_3$) particles and graphite powder in a matrix including silicon (Si) powder, iron (Fe) powder, copper (Cu) powder, magnesium (Mg) powder, manganese (Mn) powder, nickel (Ni) powder and aluminum (Al) powder. Among the matrix alloy, silicon is added for enhancing wear resistance, and iron is added for enhancing heat resistance. Alumina is added for enhancing wear resistance and graphite is added for burning resistance. The liner has an outer layer formed of an expanded material of aluminum alloy.

Now, a description will be made of a method of manufacturing the cylinder block 11 having the aforementioned structure. This process includes a step of forming the liner assembly 14, a step of molding a cast body 62 and a step of forming the communicating passages (holes 23 and 24).

Initially, a description will be given of the formation process of the liner assembly 14. In this process, the cylinder liners 31 through 34 are made first. The matrix powder comprising the aforementioned materials, alumina, and graphite are homogeneously mixed, and a cylindrical billet is molded by cold isostatic press (CIP). The billet is inserted into a can made of aluminum alloy to produce a composite billet. This composite billet is inserted into a mold for molding a cylinder liner, and an elongated material is extruded and molded while applying heat and pressure. Then, metallic bonding occurs between powders, and also the elongated material of two-layer structure having tongues 43 and 45 and/or grooves 42 and 44 at the outer layer is obtained. Thus, the tongues 43 and 45 or grooves 42 and 44 are formed by extrusion, and consequently, there is no need for forming these later. If the elongated material is cut at a predetermined length and then the recess portions 46 and 47 are formed in the outer layer by a cutting operation, the cylinder liners 31 through 34 will be obtained as shown in FIG. 1.

In order to interconnect the four cylinder liners 31 through 34, each of the connecting portions 35 of the first and fourth cylinder liners 31 and 34 is designed to have a pair of the grooves 42. One connecting portion 37 of the second and third cylinder liners 32 and 33 has a pair of the tongues 43, while the other connection portion 39 has a single groove 44 and a single tongue 45. That is, the first and fourth cylinder liners 31 and 34 are formed into the same shape, and the second and third cylinder liners 32 and 33 are formed into the same shape. For this reason, the components can be used in common, and four cylinder liners 31 through 34 can be prepared by making only the aforementioned two kinds of cylinder liners.

In addition, by varying the distances from the cylinder bores #1 through #4 to the joining surfaces 36, 38, and 41 and by forming the recess portions 46 and 47 at the indicated places, there is no need for forming recesses in the connecting portions 35 in the first and fourth cylinder liners 31 and 34. Therefore, the labor and machining cost is reduced.

Subsequently, the four cylinder liners 31 through 34 are interconnected to form the liner assembly 14. More specifically, adjacent cylinder liners 31 through 34 are connected to each other and the tongues 43 and 45 are press fitted into the corresponding grooves 42 and 44. When this occurs, adjacent joining surfaces 36 and 38 and adjacent joining surfaces 41 and 41 are brought into contact with each other by the aforementioned press fitting because the grooves 42 and 44 are formed more deeply than the height of the tongues 43 and 45 (H1>H2). Since the grooves 42 and 44 are formed narrower than the width of the tongues 43 and 45 (W1<W2), adjacent cylinder liners 31 through 34 are interconnected with an extremely small or non-existant gap therebetween.

Also, with the engagement of the joining surfaces 36 and 38 and the engagement of the joining surfaces 41 and 41, the closed spaces 21 and 22 are formed between adjacent cylinder liners 31 through 34. That is to say, between the first and second cylinder liners 31 and 32, the closed space 21 is formed by the joining surface 36 and the recess portion 46. Likewise, between the fourth and third cylinder liners 34 and 33, the closed space 21 is formed by the joining surface 36 and the recess portion 46. Furthermore, between the second and third cylinder liners 32 and 33, the closed space 22 is formed by a pair of the recess portions 47. These closed spaces 21 and 22 all have the same volume and also each closed space is located halfway between adjacent cylinder bores #1 to #4. In this way, the liner assembly 14 with three closed spaces 21, 22, and 21 is made.

Figure 5:
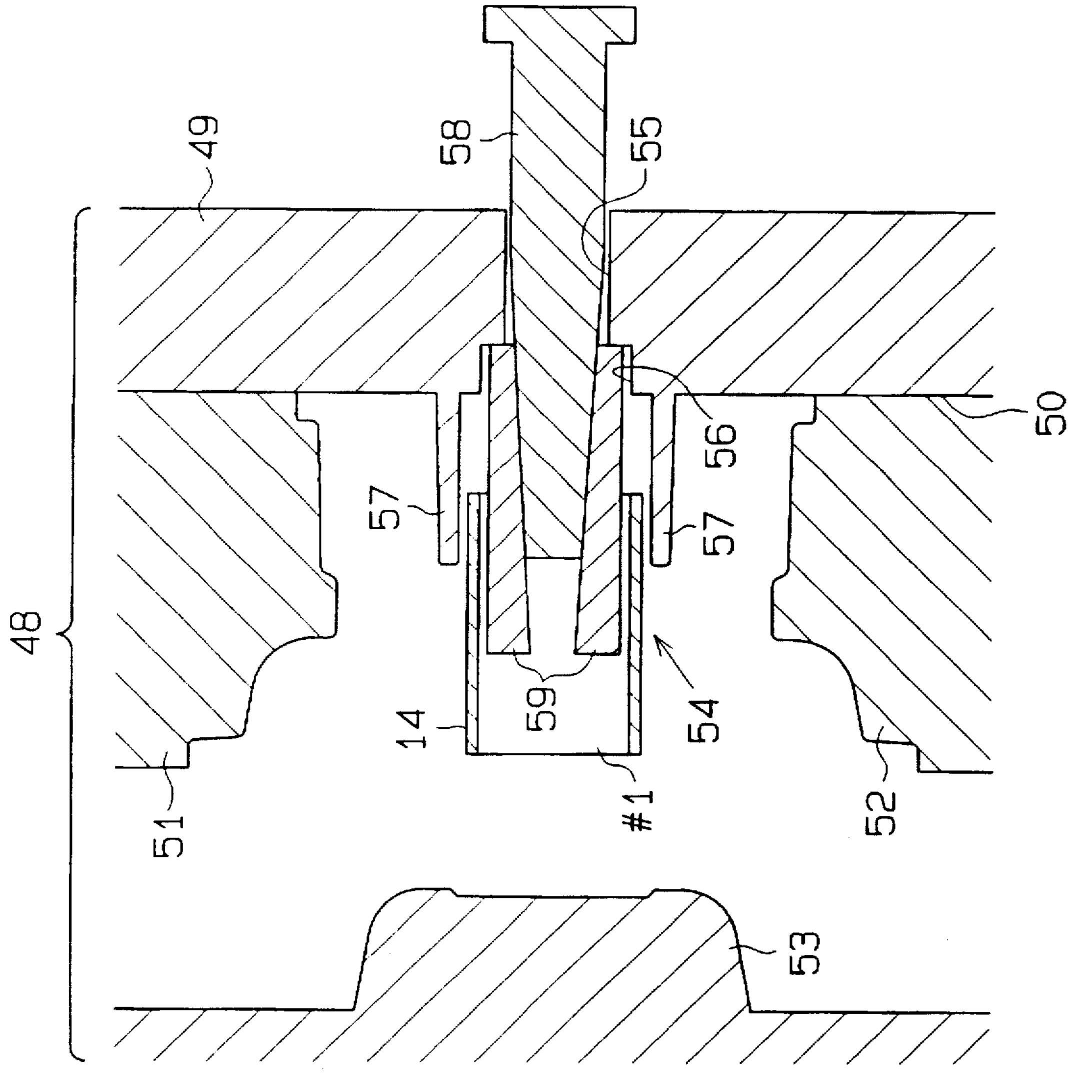
FIG. 5 is a partial cross-sectional view of a mold having an open posture.

Next, a description will be made of the molding process of a cast body. In this process, the liner assembly 14 is used as an insert and casting is carried out in aluminum. A mold 48, shown in FIG. 5, is used. This mold 48 is provided with a stationary mold 49, an upper movable mold 51, a lower movable mold 52, a side movable mold 53, and a core mechanism 54. A plurality of small diameter holes 55 and large diameter holes 56 are bored in the stationary mold 49 at a plurality of places, and each small diameter hole 55 is continuous with an associated one of the large diameter holes 56. A protruding portion 57 for forming the water jacket 16 is provided on the side surface 50 of the stationary mold 49 around each large diameter hole 56.

The upper movable mold 51 is disposed above the protruding portion 57, while the lower movable mold 52 is disposed under the protruding portion 57. Both movable molds 51 and 52 vertically reciprocate while sliding on the side surface 50 of the stationary mold 49. Thus, the movable molds 51 and 52 are moved toward and away from the protruding portion 57. The side movable mold 53 is located so that it can horizontally reciprocate, and with this reciprocal motion, the side movable mold 53 is moved toward and away from the stationary mold 49.

The core mechanism 54 is provided with rods 58 corresponding in number to the cylinder bores #1 through #4 and a plurality of core pieces 59 located around each rod 58. Each rod 58 is inserted into the large diameter hole 56 and small diameter hole 55 so that it can reciprocate with respect to the stationary mold 49. The distal end portion (left end portion in FIG. 5) of the rod 58 is formed so that its diameter is gradually reduced toward the side movable mold 53. The core pieces 59 are formed into an elongated shape and are located within the protruding portion 57 and the large diameter hole 56 so that they form an annular shape around the rod 58.

The inner peripheral surface of each core 59 is tapered so that the thickness of each core piece is reduced toward the stationary mold 49, and the inner peripheral surface is held in contact with the outer peripheral surface of the rod 58. Therefore, with longitudinal motion of the rod 58, if the contacting portion, between the rod 58 and the core pieces 59, is varied, the opposing core pieces 59 will be moved (or expanded) so that the interval between the core pieces is increased, or moved (or contracted) so that the interval is reduced. Note that, when the core pieces 59 are maximally expanded, they are brought into contact with the inner peripheral surface of the large diameter hole 56.

In a case where the liner assembly 14 is cast in aluminum by using the mold 48, first, the three movable molds 51 to 53 are moved away from the protruding portion 57, and all the rods 58 are retracted so that the core pieces 59 are contracted, as shown in FIG. 5. Then, the liner assembly 14 is inserted into the protruding portions 57 so that the core pieces 59 are allowed to enter the cylinder liners 31 through 34. Because the core pieces 59 have been contracted, they readily enter the cylinder bores #1 through #4.

When all rods 58 are moved inward from the state of FIG. 5, the core pieces 59 contacting each rod 58 will be expanded. The core pieces 59, expanded by each rod 58, are pressed against the inner peripheral surface of the corresponding diameter hole 56 and the corresponding cylinder bores #1 to #4. Thus, the liner assembly 14 is held in a predetermined position from the inner side by the core pieces 59.

Figure 6:
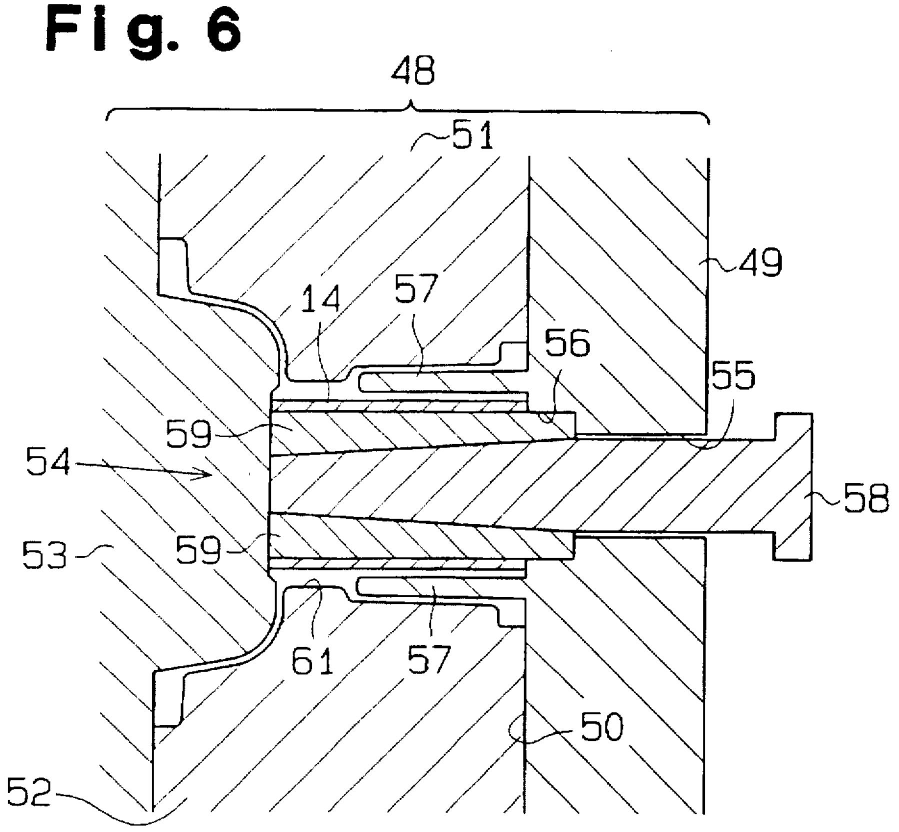
FIG. 6 is a partial cross-sectional view of the mold of FIG. 5 in a closed posture.

The three movable molds 51 to 53, as shown in FIG. 6, are moved so that they are close to the protruding portion 57. If the molds are thus clamped, a cavity 61 for molding the block body 12 will be formed between the stationary mold 49, the movable molds 51 to 53, and the liner assembly 14. Molten metal is injected into this cavity 61.

Figure 13:
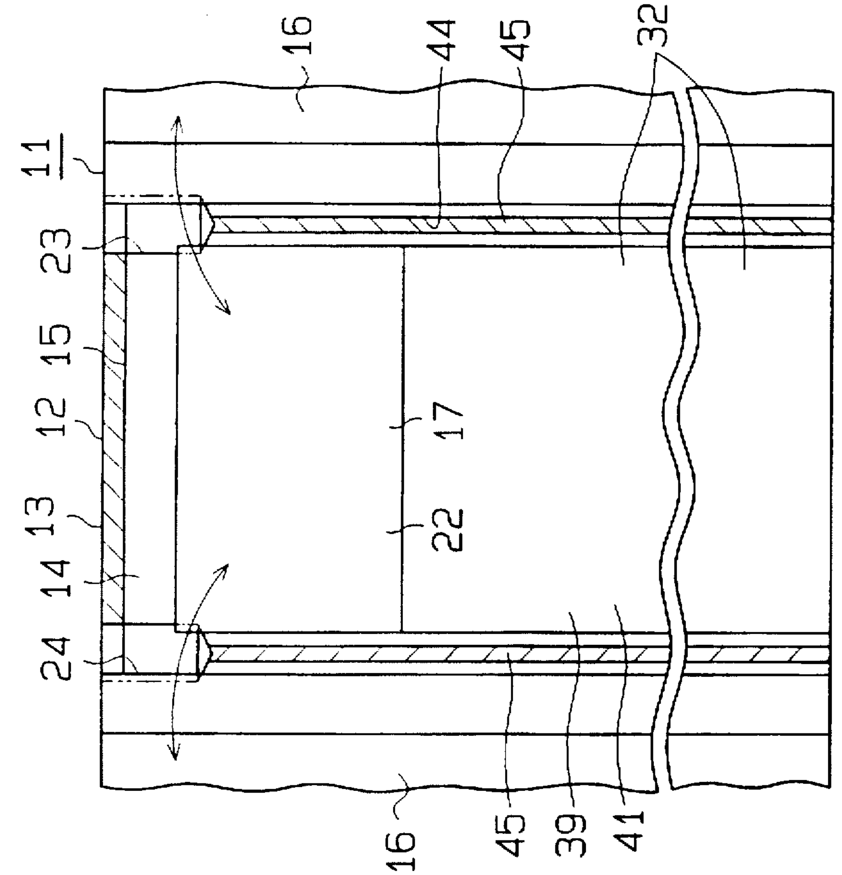
FIG. 13 is an enlarged cross-sectional view taken along the line 13—13 in FIG. 8.

Since the liner assembly 14 is formed by bonding the connecting portions 35, 37, and 39 of the cylinder liners 31 through 34 together, a gap tends to occur between adjacent connecting portions 35 and 37 and between adjacent connecting portions 39 and 39. It is possible that molten metal will enter the gaps and get into the recess portions 46 and 47. However, as shown in FIGS. 4 and 13, the tongues 43 and 45 are press fitted into the grooves 42 and 44 along the entire length of the connecting portions 35, 37, and 39, and the gap between the groove and the tongue is substantially zero. For this reason, the molten metal is prevented from passing from the side of the liner assembly 14 through the gaps and getting into the recess portions 46 and 47. In addition, because the joining surfaces 36, 38, and 41 are formed flat, the gap between the joining surfaces 36 and 38 and between the joining surfaces 41 and 41 is so small that it can be neglected, even at places other than the tongues 43 and 45 or grooves 42 and 44. For this reason, the molten metal can be prevented from passing from the top or bottom of the liner assembly 14 through the gaps and getting into the recess portions 46 and 47.

In FIG. 6, when the injected molten metal solidifies, the cast body 62 having both the liner assembly 14 and the water jacket 16 surrounding the liner assembly 14 will be molded. When this occurs, the core pieces 59 are contacted with the cylinder bores #1 through #4 with pressure and there is no gap between the core pieces and the cylinder bore.

Figure 7:
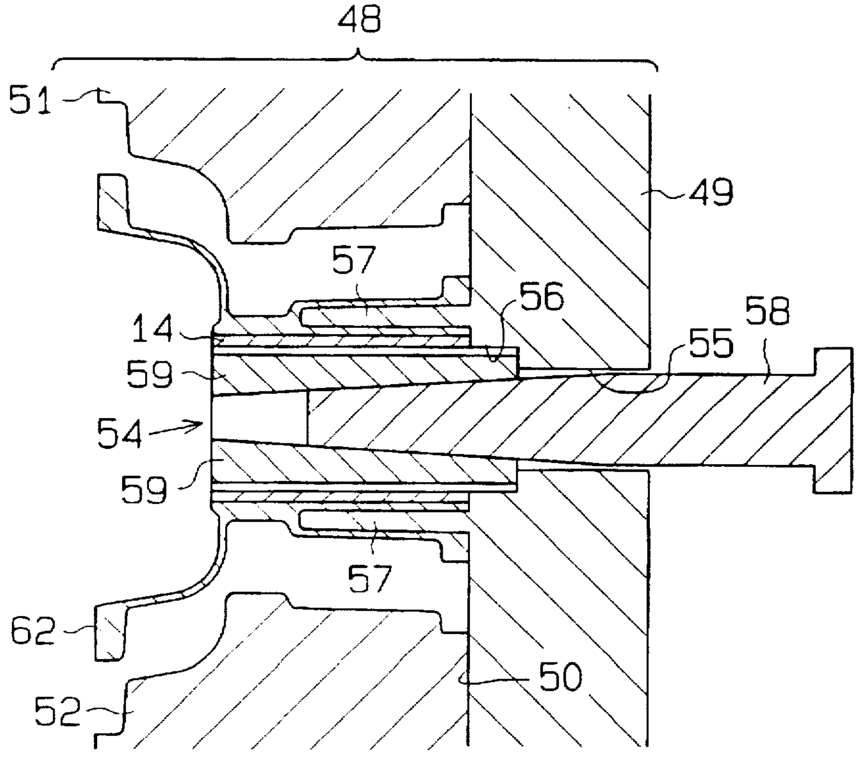
FIG. 7 is a partial cross-sectional view of a product molded by using the mold of FIGS. 5 and 6.

Next, as shown in FIG. 7, the three movable molds 51 to 53 are moved away from the protruding portions 57 and also all rods 58 are moved outward. With this outward movement, the core pieces 59 are contracted and the pressing force of the core pieces 59 against the cylinder bores #1 through #4 becomes small. Therefore, the cast body 62 with the liner assembly 14 can be readily taken out from the stationary mold 49.

If a set of cores of the type where the diameter of the core set is slightly smaller than that of the cylinder bores and cannot be varied is used instead of the core mechanism 54, a gap occurs between the cylinder bores #1 through #4 and the cores and high pressure is applied from the outside on the liner assembly 14 when casting. Therefore, there is possibility that the liner assembly 14 may become deformed toward the core set. If such deformation occurs, it is possible that the core set cannot be pulled out from the liner assembly 14 after casting.

However, in the present invention, since the core pieces 59 of the core mechanism 54 are expanded and contacted with the cylinder bores #1 through #4 with pressure, there is no gap between each core and the cylinder bore, or even if there were a gap, it would be small. For this reason, even if the molten metal shrinks while solidifying and applies force to the liner assembly 14 from the outside, that force would be received by each core piece 59 and the rod 58 and deformation would be prevented. Also, even if the liner assembly 14 were deformed, the core pieces 59 could be moved away from the cylinder bores #1 through #4, i.e., the cast body 62, because the rods 58 are tapered.

In the cast body 62 taken out from the stationary mold 49, the cylinder bores #1 through #4 of the liner assembly 14 are exposed, but the remainder of the liner is covered with the casting. Also, although the three closed spaces 21, 22, and 21 have been formed between adjacent cylinder bores #1 through #4 in the cast body 62, these closed spaces have not been communicated with the water jacket 16 yet.

Figure 12:
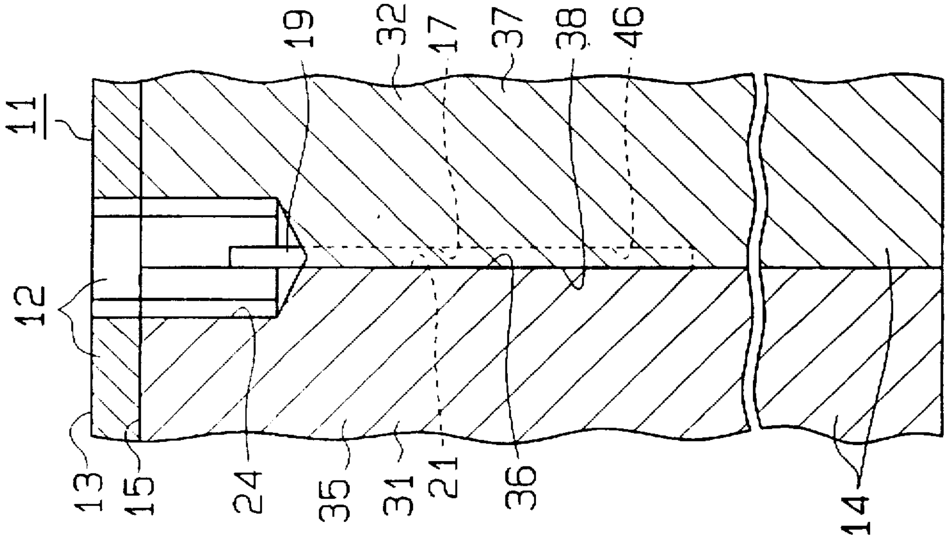
FIG. 12 is an enlarged cross-sectional view taken along the line 12—12 in FIG. 8.

Next, a description will be made of the process of forming the communicating passages. In this process, as shown in FIGS. 8 and 12, holes 23 and 24 are bored in the places corresponding to both sides of the joining portions of the connecting portions 35 and 37 (and connecting portions 39 and 39) of the liner assembly 14 from the top of the cast body 62 by a boring tool such as a drill. Then, the side portions of each closed space 21 or 22 are connected to the water jacket 16 by the holes 23 and 24. The interbore cooling water passage 17 is constituted by the closed spaces 21 and 22 and the holes 23 and 24, and the desired cylinder block 11 made of aluminum is obtained.

In manufacturing the cylinder block 11, no pipe is used for forming the interbore cooling water passage 17, unlike the prior art. By eliminating the pipe, it is possible to enlarge the width L of the interbore cooling water passage 17. In addition, because part of the interbore cooling water passage 17 is constituted by the closed spaces 21 and 22, the area that the interbore cooling water passage 17 occupies on the sealing surface 13 is smaller. Therefore, as compared with the prior art where slit grooves are formed, the area of the sealing surface 13 between each of the cylinder bores #1 through #4 is greater. Furthermore, by forming the recess portions 46 and 47 constituting the closed spaces 21 and 22 with a suitable size, it is possible to form the interbore cooling water passage 17 with a volume larger than that of a drill path bored by a conventional drill.

In the engine where the cylinder block 11 thus obtained is used as a component, as shown in FIG. 9, a cylinder head 64 is assembled on the cylinder block 11 through a gasket 63, and an oil pan (not shown) is secured to the lower surface of the cylinder block 11. During the operation of this engine, air-fuel mixture is burnt in the combustion chamber 27, and the walls of the combustion chamber 27, that is, the cylinder liners 31 through 34 reach a high temperature. When this occurs, the cooling water 19 flows through the water jacket 16, and some of the cooling water 19 flows through the interbore cooling water passage 17. Heat is transferred between the high-temperature cylinder liners 31 through 34 and the cooling water 19, and the cylinder liners 31 through 34 are cooled.

Each interbore cooling water passage 17 is positioned halfway between adjacent cylinder bores #1 through #4, and the distances from the cylinder bores #1 through #4 to the respective interbore cooling water passages 17 are equal to one another. For this reason, the adjacent cylinder liners 31 through 34 are equally cooled by the cooling water 19 flowing through the cooling water passages 17.

By providing the interbore cooling water passages 17 in addition to the water jacket 16, the cylinder bores #1 through #4 are cooled about their entire peripheries. At this time, because the interbore cooling water passage 17 has a large volume, as described above, the cylinder bores #1 through #4 are cooled more effectively than with the prior art designs where the interbore cooling water passages are formed by a drill.

With the aforementioned cooling, the temperature distribution of the peripheral regions of the cylinder bores #1 through #4 is nearly uniform, and the amount of distortion of the cylinder bores #1 through #4 resulting from a non-uniform temperature distribution is reduced. In other words, even during operation of the engine, each of the cylinder bores #1 through #4 is held to a cylindrical shape having a circular opening, that is, the bore can be held to a high degree of roundness. This means that the piston ring 25 satisfactorily follows the reciprocal motion of the piston 26, a gap is hardly generated between the ring 25 and each of the cylinder bores #1 through #4, and that engine oil hardly passes through this gap and hardly gets into the combustion chamber 27.

Thus, the quantity of engine oil burned in the combustion chamber 27 will be reduced, and therefore, only a small contact pressure between the piston ring 25 and the cylinder bores #1 through #4 will be required. By making the tension of the piston ring 25 (outward expansion force) small and thus making the sliding resistance (friction) between the piston ring 25 and each of the cylinder bores #1 through #4 small, the output of the engine can be increased or the fuel cost can be reduced.

In addition, because the area of the sealing surface 13 between the cylinder bores #1 through #4 has become greater, the sealing area with the gasket 63 increases and the sealing performance with respect to the air-fuel mixture or combustion gas is improved as compared with the prior art designs where slit grooves are formed.

Furthermore, this invention achieves high sealing performance because the liner assembly 14 is buried in the block body 12 and the sealing surface of the block body 12 is formed flat. That is, if the liner assembly 14 is constructed so that the top surface 15 thereof is exposed, a boundary line will be exposed between the top surface 15 and the top surface of the block body 12. These top surfaces function as a sealing surface for sealing the gasket 63. The liner assembly 14 and the block body 12 are formed of different materials having different linear expansion coefficients. Thus, even if the top surface 15 of the liner assembly 14 and the top surface of the block body 12 are initially positioned on the same plane, a step portion would be formed between both top surfaces when both the liner assembly 14 and the block body 12 are heated due to the operation of the engine. This will cause a gap between the step portion and the gasket 63, and sealing performance will be reduced.

On the other hand, in the present invention, the liner assembly 14 is buried in the block body 12, and the sealing surface 13 is constituted only by the top surface of the block body 12. For this reason, even when the thermal expansion differs between the liner assembly 14 and the block body 12 because of the difference between the liner expansion coefficients, a good seal is achieved because the sealing surface 13 is flat with no step.

In addition, since the interval between adjacent cylinder bores #1 through #4 is very narrow, as described above, the entire length of the cylinder block 11 (length in the direction of the array of the cylinder bores #1 through #4) is short and the entire length of the engine becomes short. For this reason, the weight of the engine is reduced and the mounting flexibility on a vehicle is enhanced.

Furthermore, where the cylinder is formed of aluminum, normally the inner surface of the cylinder bore is plated with nickel, a metal matrix composite (MMC) layer is formed inside the cylinder bore, or a high-silicon aluminum alloy (A390) is etched, in order to improve the sliding characteristics between the piston and the piston ring. In such a case, in order to maintain the quality of the inner surface of the cylinder bore, the cylinder is manufactured with low-pressure casting and low-speed and intermediate-pressure casting, but as compared with a die-cast method, the average thickness is great, the entire cylinder block is heavy, and the casting cycle is long.

However, in the present invention, nearly the same strength and toughness as a cast-iron cylinder liner are obtained by forming the cylinder liners 31 through 34 into a special structure as described above (two-layer structure consisting of an inner layer and an outer layer). Thus, a post process for increasing strength is unnecessary, and the liner assembly 14 can be cast by using the die-cast process as it is. The installation investment needed for manufacturing the cylinder block 11 of this novel structure is thus minimized. In addition, because the die-cast method can be used, the average thickness of the cylinder block 11 can be made thin, the weight can be reduced, and the casting cycle can be shortened.

Figure 14:
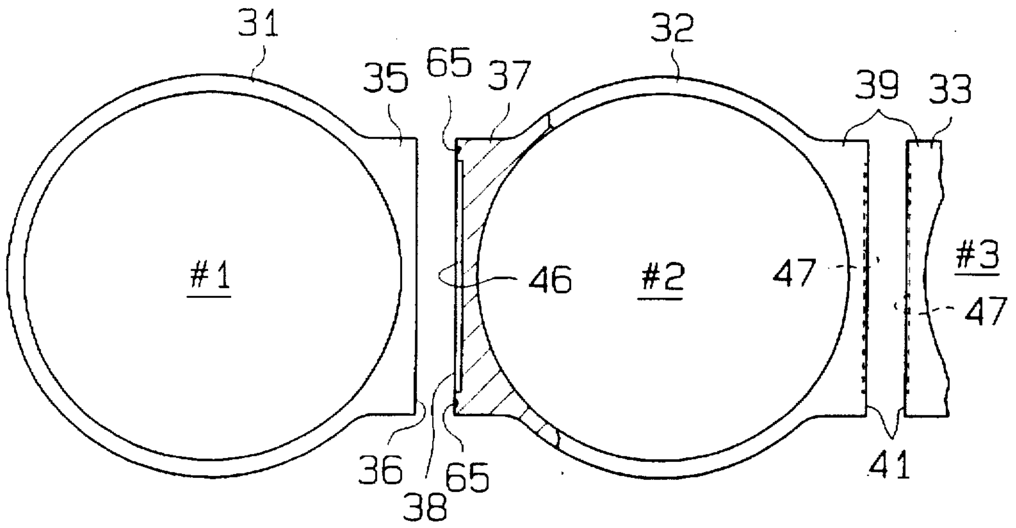
FIG. 14 is a partial plan view of cylinder liners according to a second embodiment of the present invention.
Figure 15:
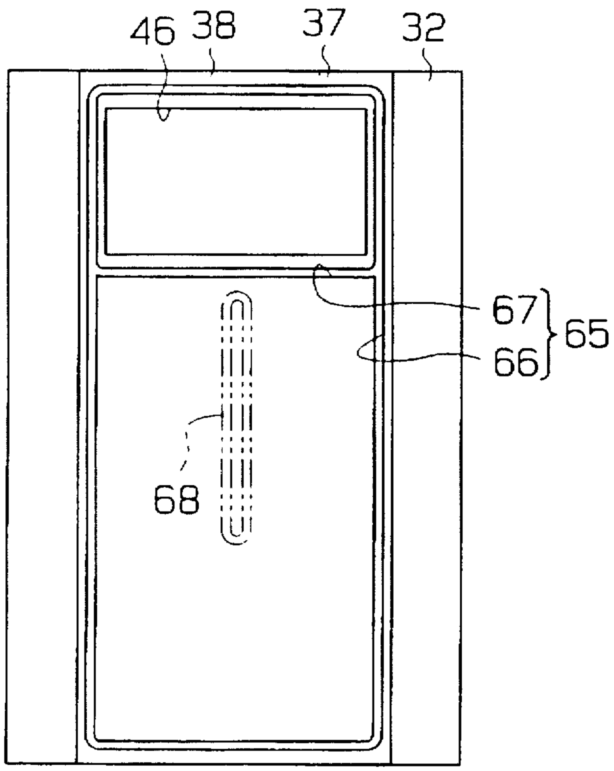
FIG. 15 is a left side view of a second cylinder liner shown in FIG. 14.

Next, a second embodiment will be described according to FIGS. 14 and 15. The second embodiment is different from the first embodiment with respect to the connecting structure and method of connecting adjacent cylinder liners 31 through 34. That is, a groove 65 for applying an adhesive agent is provided in either a joining surface 36 or a joining surface 38, or in one of the adjacent joining surfaces 41. The groove 65, as shown in FIG. 15, comprises a main portion 66 formed into a rectangular shape along the peripheral margin of the joining surface 38 (36, 41) and a straight partition 67 extending along the lower edge of a recess portion 46 (47) and connected to the main portion 66.

In a case where adjacent cylinder liners 31 through 34 are interconnected, an adhesive is applied to the groove 65, and the joining surface 38 (36, 41) where the groove 65 is not located is pressed to the joining surface having the groove 65. When the adhesive agent solidifies, the cylinder liners 31 through 34 will be strongly bonded through the adhesive agent, and the desired liner assembly 14 will be obtained. In a case where casting is performed by using this liner assembly 14 as an insert, the adhesive agent prevents molten metal from passing through the joining surface 38 (36, 41) and getting into the recess portion 46 (47).

Otherwise, the structure and method of the second embodiment are identical with the first embodiment and therefore further description is omitted. Therefore, this embodiment has the same operation and advantages as the first embodiment, and in addition, the adhesive agent and the groove 65 both function to bond the connecting portions 35, 37, and 39 and to seal against molten metal. In this case, the grooves 42 and 44 or the tongues 43 and 45 in the first embodiment can be omitted.

Figure 16:
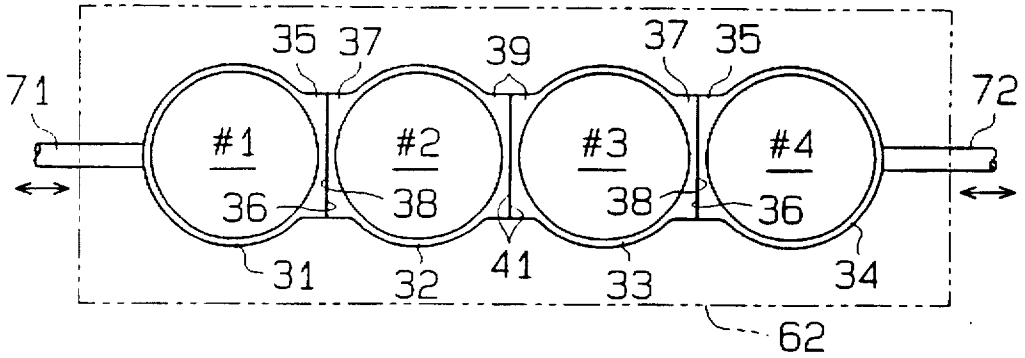
FIG. 16 is a schematic plan view showing how a liner assembly according to a third embodiment of the present invention is formed.
Figure 17:
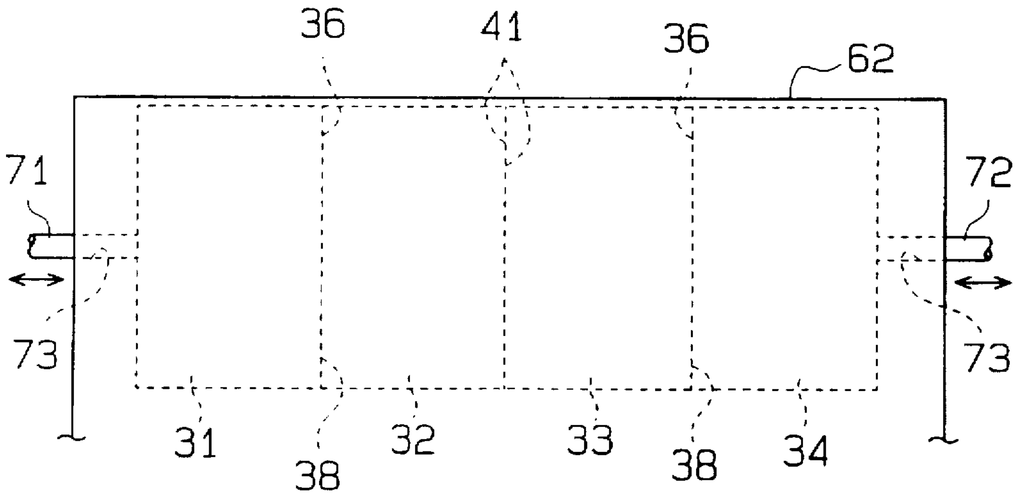
FIG. 17 is a schematic front view of the assembly of FIG. 16.

Next, a third embodiment will be described referring to FIGS. 16 and 17. This embodiment is different in that each of the joining surfaces 36, 38, and 41 has a very flat, smooth surface like a mirror, except for the recess portions 46 and 47. In addition, when making a cast body 62, a mold with a pair of pins 71 and 72 is used. The pins 71 and 72 are arranged so that they can move back and forth longitudinally.

During casting, both pins 71 and 72 are moved outward from the mold, and cylinder liners 31 through 34 are arranged in a line and are placed within the mold. The pin 71 is moved inward so that the first cylinder liner 31 is pushed toward the second cylinder liner 32. Also, the pin 72 is moved inward so that the fourth cylinder liner 34 is pushed toward the third cylinder liner 33. Adjacent joining surfaces 36 and 38 contact each other with pressure, and adjacent joining surfaces 41 are contacted with each other with pressure, whereby the liner assembly 14 is formed. In this state, molten metal is injected into the mold and a cast body 62 is molded. After the molten metal solidifies, both the pins 71 and 72 are retracted and the cast body 62 is taken out from the mold 48.

Holes 73 are produced in the cast body 62 by the pins 71 and 72. Since these holes 73 communicate the water jacket 16 with the outer surface of the cast body 62, they are closed with plugs (not shown) after the cast body 62 is taken out.

Otherwise, the third embodiment is identical with the first and second embodiments and therefore further description is omitted. Therefore, this embodiment has the same operation and advantages as the first and second embodiments, and in addition, the grooves 42 and 44, the tongues 43 and 45, and the groove 65 are unnecessary. In addition, the operation of applying an adhesive can be omitted.

Next, a fourth embodiment will be described referring to FIGS. 18 through 23. This embodiment differs in the shape of the connecting portions 35, 37, and 39 of the cylinder liners 31 through 34, the formation process of the liner assembly 14, and the molding process of the cast body 62.

These differences are based on the following reasons. In a case where tongues 43 and 45 are press fitted into grooves 42 and 44. There are some cases where a slight gap occurs between 42 and 43 or between 44 and 45 due to manufacturing tolerances or the like. On the other hand, these grooves 42 and 44 and the tongues 43 and 45 are positioned in the places corresponding to the holes 23 and 24 serving as communicating passages. Thus, during operation of the engine, part of the cooling water 19 flowing through the interbore cooling water passage 17, particularly the holes 23 and 23, gets into the gap. Therefore, there is the possibility that some cooling water 19 will leak from the lower end of the gap into a crankcase 79 (see FIG. 9).

While, in this embodiment, only the connecting portions 35 and 37 of the first and second cylinder liners 31 and 32 are used as an example, the same may be applied to the other connecting portions.

Figure 19:
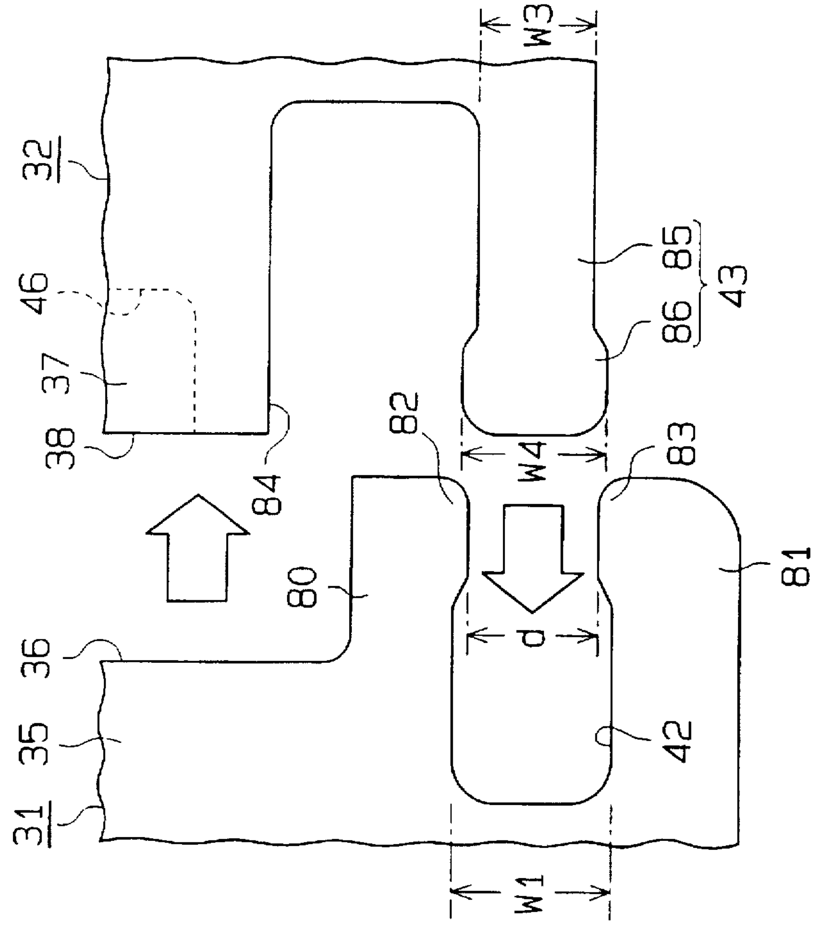
FIG. 19 is a partial enlarged plan view showing a state where ridges are going to be fitted in grooves.
Figure 18:
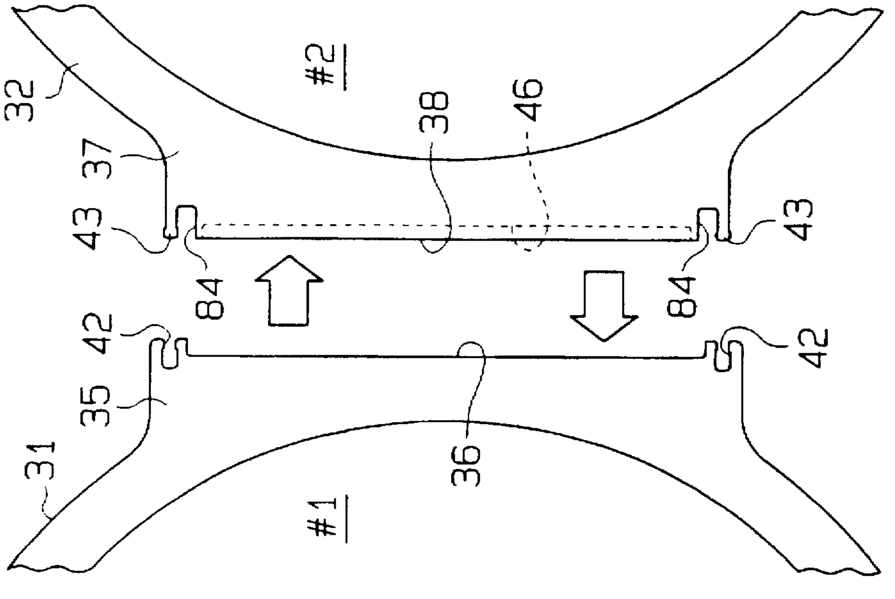
FIG. 18 is a partial plan view showing a state where adjacent cylinder liners are going to be joined with each other according to a fourth embodiment of the present invention.

Initially the points of difference of the connecting portions 35 and 37 will be described. As shown in FIGS. 18 and 19, a pair of grooves 42, as in the first embodiment, are formed in the side portions of the joining surface 36 of the first cylinder liner 31. A pair of clamping tongues 80 and 81 are integrally formed at both sides of each groove 42 of the joining surface 36. The distal end of each clamping tongue 80 (81) is provided with a bulged portion 82 (83) extending toward the opposing clamping tongue 81 (80).

On the other hand, on the sides of the joining surface 38 of the second cylinder liner 32, as with the first embodiment, a pair of tongues 43 is provided extending along the entire height of the cylinder liner 32. The tongues 43 are provided by forming grooves 84 in the connecting portion 37. The tongue 43 includes a main portion 85 and a head portion 86 positioned at the distal end. The width W3 of the main body portion 85 is set so that it is narrower than the distance d between the bulged portions 82 and 83. The width W4 of the head portion 86 is set so that it is wider than the distance d and narrower than the width W1 of the groove 42. Therefore, the tongue 43 can be fitted into the groove 42 by press fitting the head portion 86 between the bulged portions 82 and 83. The distal end of the head portion 86 is located on nearly the same plane as the joining surface 38.

Figure 22:
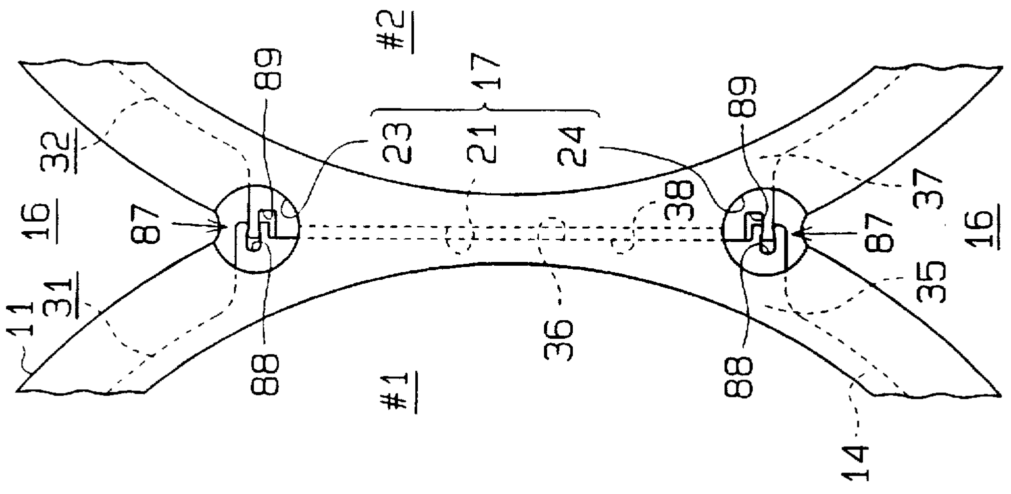
FIG. 22 is an enlarged plan view of the portion between the cylinder bores in the molded product.

In this embodiment, a pair of fittings 87 (FIG. 20) is constituted by the grooves 42, 84, the clamping tongues 80 and 81, and the tongue 43. The location of the fittings 87, as shown in FIG. 22, is where the holes 23 and 24 are bored in the process of forming the communicating passages.

Figure 21:
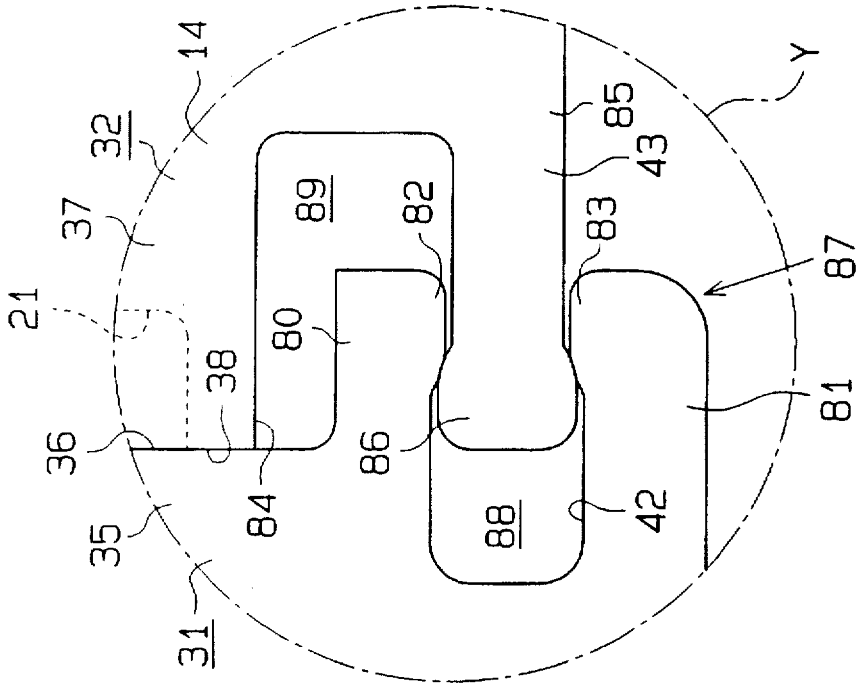
FIG. 21 is an enlarged plan view of the portion Y in FIG. 20.

Furthermore, the shape or size of the grooves 42 and 84 is made so that spaces 88 and 89 into which molten metal can flow are formed in the vicinity of the fitting 87 between the connecting portions 35 and 37, when the head 86 is fitted into the groove 42 as shown in FIG. 21. One space 88 is surrounded and formed by the wall surfaces of both clamping tongues 80 and 81, head portions 86, and groove 42, when the head portion 86 is press fitted up to the limit (when joining surfaces 36 and 38 contact each other and further press fitting of head portion 86 is regulated). The other space 89 is surrounded and formed in the same manner by the wall surfaces of one clamping tongue 80, tongue 43, and groove 84. These spaces 88 and 89 are required to have a width of 0.2 mm or more in view of the flowability of molten metal. If the width is narrower than 0.2 mm, molten metal (aluminum for this case) may not sufficiently flow into the spaces 88 and 89.

Figure 20:
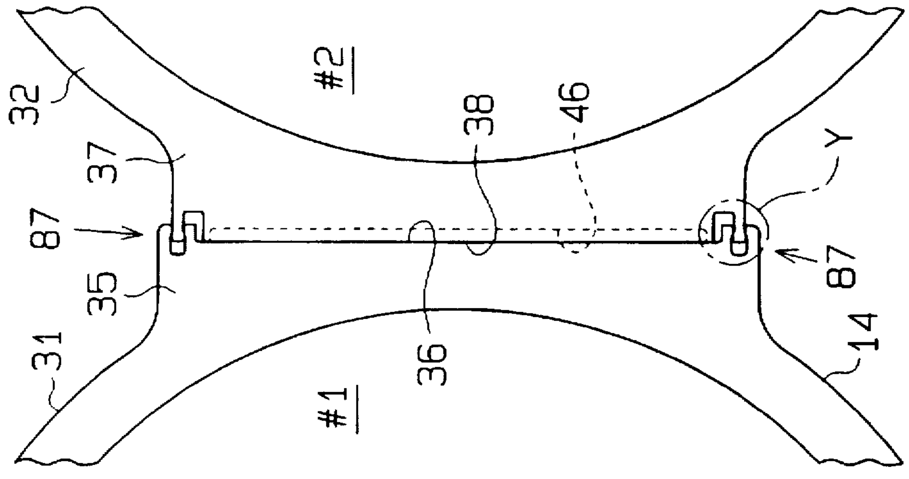
FIG. 20 is a partial plan view showing a state where the adjacent cylinder liners are joined with each other.

Next, the differences from the first embodiment will mainly be described with reference to the formation process of the liner assembly 14 using the cylinder liners 31 and 32. Initially, the adjacent first and second cylinder liners 31 and 32 are moved toward each other, as shown by arrows in FIGS. 18 and 19. During this movement, the head portion 86 of the tongue 43 is brought into contact with the distal ends of the corresponding clamping tongues 80 and 81. The head portion 86 is press fitted between the bulged portions 82 and 83 having the distance d narrower than the width W4 of the head portion 86. If the major part of the head portion 86 is pressed in until passing through both bulged portions 82 and 83, both joining surfaces 36 and 38 will be in contact with each other. If both connecting portions 35 and 37 are thus fitted at the fittings 87, adjacent cylinder liners 31 and 32 will be bonded with each other, as shown in FIGS. 20 and 21. The liner assembly 14 is formed with the closed space 21 between both connecting portions 35 and 37 and also has, at two places in the fittings 87, the spaces 88 and 89 into which molten metal can flow.

Figure 23:
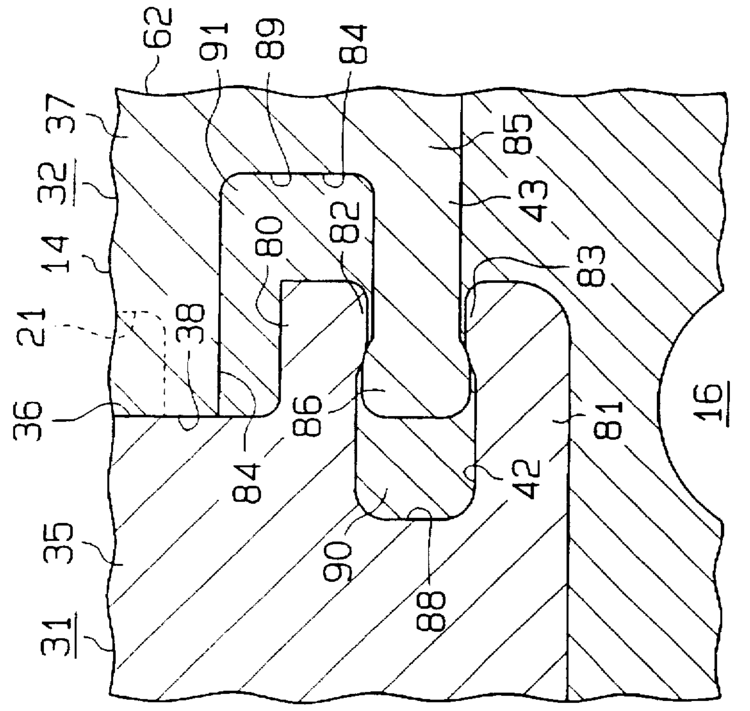
FIG. 23 is an enlarged cross-sectional view showing a state where gaps are filled with a metal.

Again, differences from the first embodiment will be mainly described with reference to the molding process of the cast body 62. The liner assembly 14 is used as an insert. This insert is arranged in the predetermined position within the mold 48 shown in FIG. 5, and metal in the molten state is pressurized to a predetermined pressure and is injected into the cavity. Part of the injected molten metal flows into the two spaces 88 and 89. The molten metal gets into the spaces 88 and 89 with reliability because both spaces 88 and 89 are sufficiently large (0.2 mm across or more). Then, when the molten metal, filled in the spaces 88 and 89, is cooled and solidified, and, as shown in FIG. 23, the cast body 62 will be formed, which has the water jacket 16 surrounding the liner assembly 14. Thereafter, this cast body 62 is taken out from the mold 48.

Although the closed space 21 has been formed between adjacent cylinder bores #1 and #2 in the mold 48, the space 21 has not yet been connected with the water jacket 16.

Next, as shown in FIG. 22, holes 23 and 24 are bored in the places corresponding to both sides of the joining surfaces 36 and 38 of the connecting portions 35 and 37 of the liner assembly 14, that is, through the fittings 87 from the top of the cast body 62 by a boring tool such as a drill. Then, the sides of the closed space 21 and the water jacket 16 are communicated with each other by the holes 23 and 24. The interbore cooling water passage 17 is formed by the closed space 21 and the holes 23 and 24, and the desired cylinder block 11 made of aluminum is obtained.

Therefore, even if the cooling water 18 flows into the holes 23 and 24 during operation of the engine, the cooling water 19 will be prevented from getting into the boundary portion between the components constituting the fitting portion 87 by the metal 90 and 91 in the spaces 88 and 89. As a result, potential risk that the cooling water 19 will leak from the lower end of the cylinder block 11 into the crankcase 79 can be prevented beforehand.

This embodiment has the following features in addition to the features described above:

(a) By making use of molten metal injected for formation of the cast body 62, the molten metal is caused to flow into the spaces 88 and 89, nearly at the same time the liner assembly 14 is cast. Accordingly, as compared with a case where molten metal is injected into the spaces 88 and 89 separately from the formation of the cast body 62, the molten metal can be injected and filled into the spaces 88 and 89 comparatively easily and without requiring additional time for injection of molten metal.

(b) The grooves 42 and 48, the clamping tongues 80 and 81, the engagement tongue 43 are molded at the same time as the cylinder liners 31 through 34. Accordingly, machining of the spaces 88, 89 is not required, and the desired spaces 88 and 89 are obtained easily.

(c) The shape of the side portions of each connecting portion 35 (37 and 39) is designed so that the bonding of the cylinder liners 31 and 32 and the formation of the spaces 88 and 89 can be realized at the same time with a single simple process where the head portion 86 of the engagement tongue 43 is press fitted between the bulged portions 82 and 83 to contact the joining surfaces 36 and 38 together.

Next, a fifth embodiment will be described referring to FIGS. 24 through 29.

The form of this embodiment is entirely different from the first, second, and third embodiments with respect to the shape of the recess portion and the method of forming the interbore cooling water passage 17. While the first and second cylinder liners 31 and 32 are used in the following discussion for convenience, the same may be applied to the cylinder liners 33 and 34.

Figure 24:
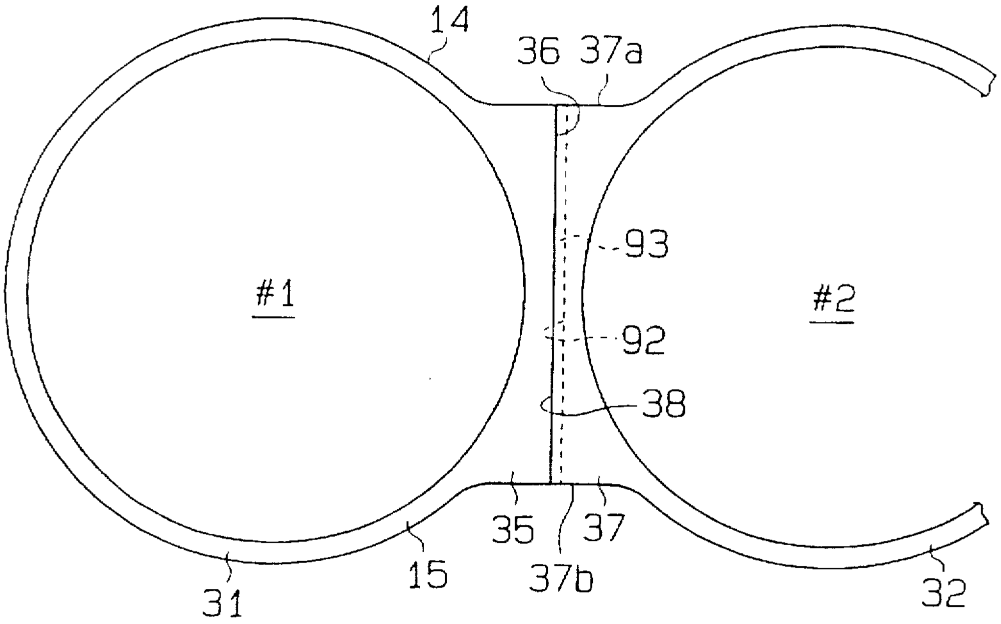
FIG. 24 is a partial plan view of a liner assembly according to a fifth embodiment of the present invention.
Figure 25:
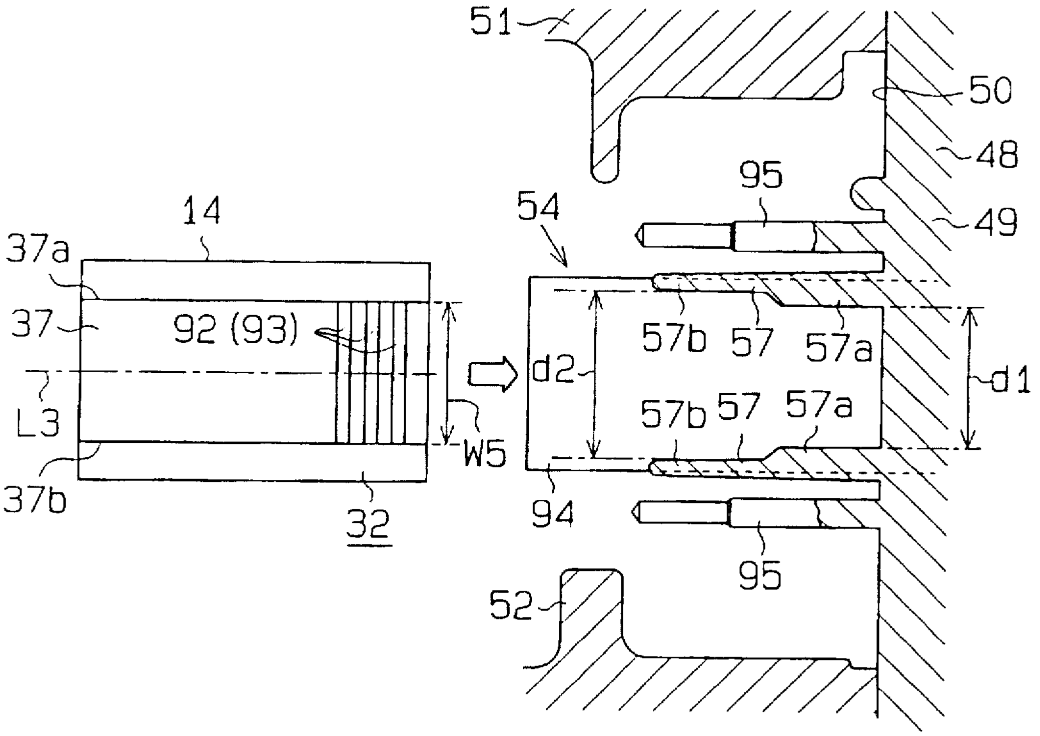
FIG. 25 is a cross-sectional view showing where the liner assembly is going to be placed in a mold.

Initially the differences in the recess portion will be described. As shown in FIGS. 24 and 25, a plurality of grooves 92 extending from one side surface 37*a* of a connecting portion 37 to the other side surface 37*b* are provided in the upper portion (right portion in FIG. 25) of the joining surface 38 of the second liner 32. As an example, three grooves 92 crossing the axis L3 of the second cylinder liner 32 are shown in FIG. 25. The recess portion is constituted by these grooves 92.

Next, a description will be made of a method of manufacturing the cylinder block 11 having the interbore cooling water passage 17. This method is comprised of a process of forming the liner assembly 14, a process of arranging the liner assembly 14 in the mold 48, a process of molding the cast body 62, and a process of forming the water jacket 16 and the interbore cooling water passage 17.

In the formation process of the liner assembly 14, the cylinder liners 31 and 32 are first made as shown in FIG. 24. Matrix powder, alumina, and graphite, described in the first embodiment, are homogeneously mixed, and a billet with holes is formed by CIP. The billet is inserted into a can made of aluminum alloy to produce a composite billet, and the temperature of the billet is raised by applying heat. This composite billet is inserted into a mold and is extruded with pressure. Then, metallic bonding occurs between powders, and an elongated material of two-layer structure is obtained. The elongated material is cut to a predetermined length, and then a cutting operation is applied to the outer layer. As a consequence, the second cylinder liner 32 having three grooves 92 at the top of its joining surface 38 is obtained as shown in FIG. 24. In the same way, the first cylinder liner 31 is molded.

Subsequently, the cylinder liners 31 and 32 are connected to form the liner assembly 14. In this connection, the method of press fitting a tongue into a groove (the first embodiment), the method of using an adhesive between connecting portions (the second embodiment), and the method of contacting cylinder liners together by pins (the third embodiment) can be used.

When the liner assembly 14 is formed as described above, the joining surfaces 36 and 38 will contact each other, and between adjacent cylinder liners 31 and 32, a through passage 93 opening at the opposite side surfaces 37*a* and 37*b* of the connecting portion 37 will be formed by each groove 92 and the joining surface 38.

Figure 27:
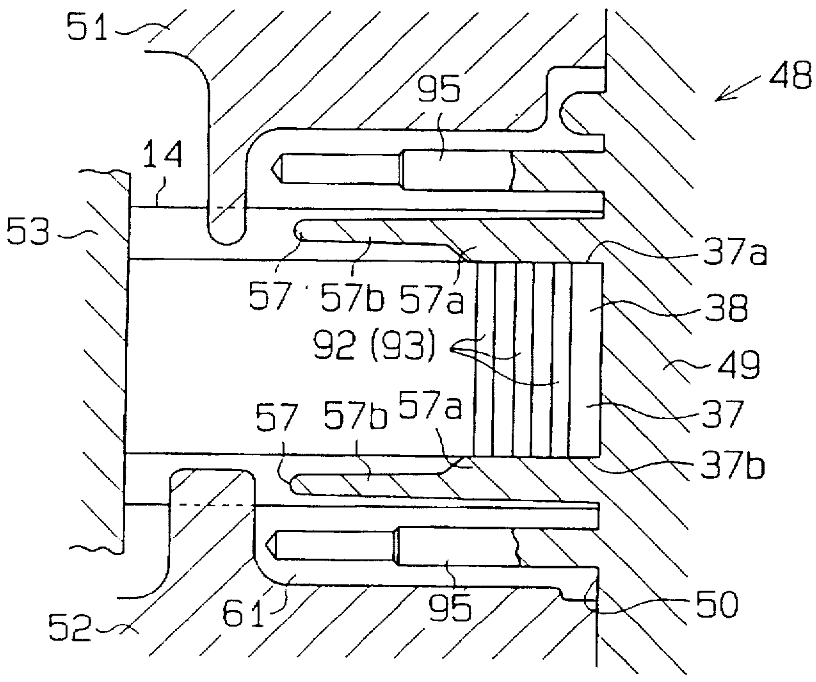
FIG. 27 shows a cross-sectional view where the connecting portions are fully fitted on the thick portions of the protrusions of the die.

Next, a description will be made of the process of arranging the liner assembly 14 in the mold 48. As shown in FIGS. 25 and 27, this mold 48, basically similar to the first embodiment, is equipped with a stationary mold 49, an upper movable mold 51, a lower movable mold 52, a side movable mold 53, and a core mechanism 54. A protruding portion 57 for forming the water jacket 16 comprises a thick portion 57*a* and a distal end portion 57*b*. The distance d1 of the thick portion 57*a* is set so as to be slightly smaller than the width (distance between side surfaces 37*a* and 37*b*) W5 of the connecting portion 37, and the distance d2 of the distal end portion 57*b* is made larger than the width W5.

The core mechanism 54 is equipped with a plurality (same number as the numbers of cylinders) of core pins 94 protruding from the stationary mold 49 toward the side movable mold 53. Each core pin 94 is formed in a round bar shape having a diameter slightly smaller than the cylinder bore #1 (#2). On the outside of the protruding portion 57, a plurality of pins 95, for forming bolt holes 96 (shown in FIG. 29), are provided on the side surface 50 of the stationary mold 49. Each bolt hole 96 is a hole into which a bolt is screwed for securing the cylinder head 64 to the cylinder block 11.

In order to arrange the liner assembly 14 in the mold 48, first the three movable molds 51 to 53 are moved away from the molded protruding portion 57, and the mold 48 is opened as shown in FIG. 25. The cylinder liner 32 (31) of the liner assembly 14 is put over the corresponding core pin 94 and is pushed as far as the position shown in FIG. 26. This position is the position where the connecting portion 37 (35) starts contacting the thick portion 57*a* when the liner assembly 14 is pushed in.

For closing the mold 48, three movable molds 51 to 53 are moved close to the protruding portion 57. During this movement, the side movable mold 53 is brought into contact with the liner assembly 14. As the side movable mold 53 is further moved, the liner assembly 14 is pushed by the movable mold 53, and the connecting portion 37 is press fitted into the space enclosed by the thick portion 57*a*. Then, when the mold 48 is completely closed, the upper end of the liner assembly 14 will contact the side surface 50 of the stationary mold 49. In this state, the opposite ends of each through passage 93 are closed by the thick portion 57*a*. Also, between the stationary mold 49, the movable molds 51 to 53, and the liner assembly 14, a cavity 61 for molding the block body 12 is formed.

The process of forming the cast body 62 is as follows. In this process, molten metal is injected into the aforementioned cavity 61. At this time, the connecting portions 35 and 37 have been bonded together and the gap between the joining surfaces 36 and 38 is substantially zero. In addition, the ends of all the through passages 93 have been closed by the thick portion 57*a*. Thus, molten metal is prevented from getting into all the through passages 93.

Figure 28:
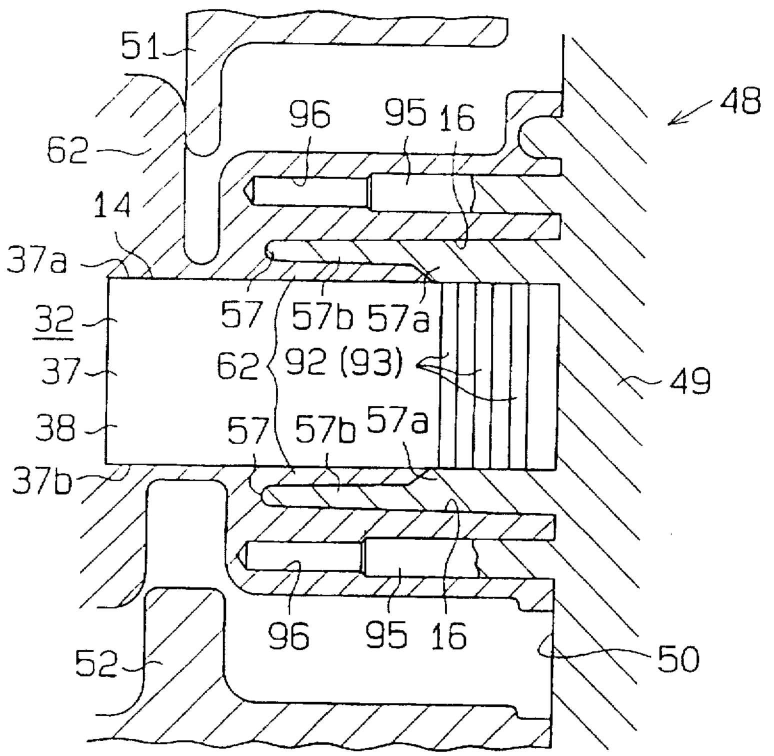
FIG. 28 is a cross-sectional view showing where a product is molded in a mold.
Figure 29:
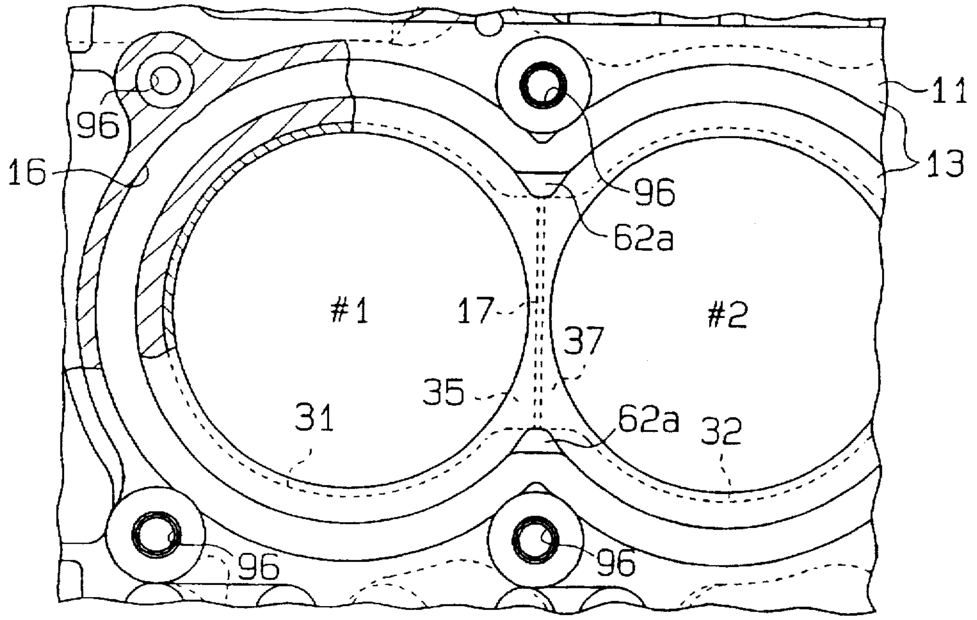
FIG. 29 is a partial plan view showing a cylinder block.

When the molten metal solidifies, the cast body 62 having the liner assembly 14, the water jacket 16 surrounding the liner assembly 14 and the plurality of bolt holes 96 positioned outside the water jacket 14, cast in that metal (aluminum), will be formed as shown in FIG. 28.

The following is a description of the process of forming the water jacket 16 and the interbore cooling water passage 17. In this process, three movable molds 51 to 53 are moved away from the protruding portion 57, and also, the cast body 62 is pushed out from the mold 48 by a knockout pin (not shown). The cast body 62 is then disengaged from the core pins 94, the pins 95, and the protruding portion 57. The opposite ends of the through passage 93, which have been closed by the thick portion 57*a*, are opened. As a consequence, between the adjacent connecting portions 35 and 37, the interbore cooling water passage 17 communicating with the water jacket 16 is formed, and the aluminum cylinder block 11, shown in FIG. 28, is obtained.

Therefore, even in this embodiment, like the first, second, and third embodiments, the interbore cooling water passage 17, through which a sufficient amount of cooling water can pass, is formed although the interval between the cylinder bores #1 and #2 is small. In addition, a sufficient sealing surface 13 area is obtained between the cylinder bores #1 and #2. Furthermore, in this embodiment, the liner assembly 14, where the opposite ends of the through passages 93 are open at the side surfaces 37*a* and 37*b* of the connecting portion 37, is formed, and the opening is closed or opened by part of the mold 48 (protruding portion 57). Accordingly, there is no need for cutting out part of the cast body 62 for forming the interbore cooling water passage 17 after molding of the cast body 62. The number of manufacturing steps is reduced and the manufacturing cost of the cylinder block 11 is reduced.

This embodiment has the following features in addition to the above:

(a) The whole of the protruding portion 57 is not made as the thick portion 57*a*, but only portions corresponding to the opposite ends of the through passage 93 are made as the thick portion 57*a*. Thus, when the liner assembly 14 is arranged in the mold 48 and then the mold 48 is clamped, the distal end portion 57*b* of the protruding portion 57 is moved away from the connecting portion 37 (35). In other words, space is formed between the connecting portion 37 (35) and the distal end portion 57*b*, and this space becomes part of the cavity 61. During casting, some of the molten metal gets into the space and covers the lower portion below the through passages 93 in the liner assembly 14. The area of the liner assembly 14, held by the cast body 62, is increased by the amount of the covered portion 62*a*, and the holding strength of the liner assembly 14 in the cylinder block 11 is improved.

(b) The distance d1 of the thick portion 57*a* is set slightly smaller than the width W5 of the connection portion 37. Thus, with the liner assembly 14 completely covered by the core pin 94, as shown in FIG. 27, the thick portion 57*a* presses against the side surfaces 37*a* and 37*b* of the connecting portion 37. Because the gap between the side surfaces 37*a* and 37*b* and the thick portion 57*a* is substantially zero, the molten metal can be reliably prevented, during casting, from getting from this gap into the through passage 93.

Figure 26:
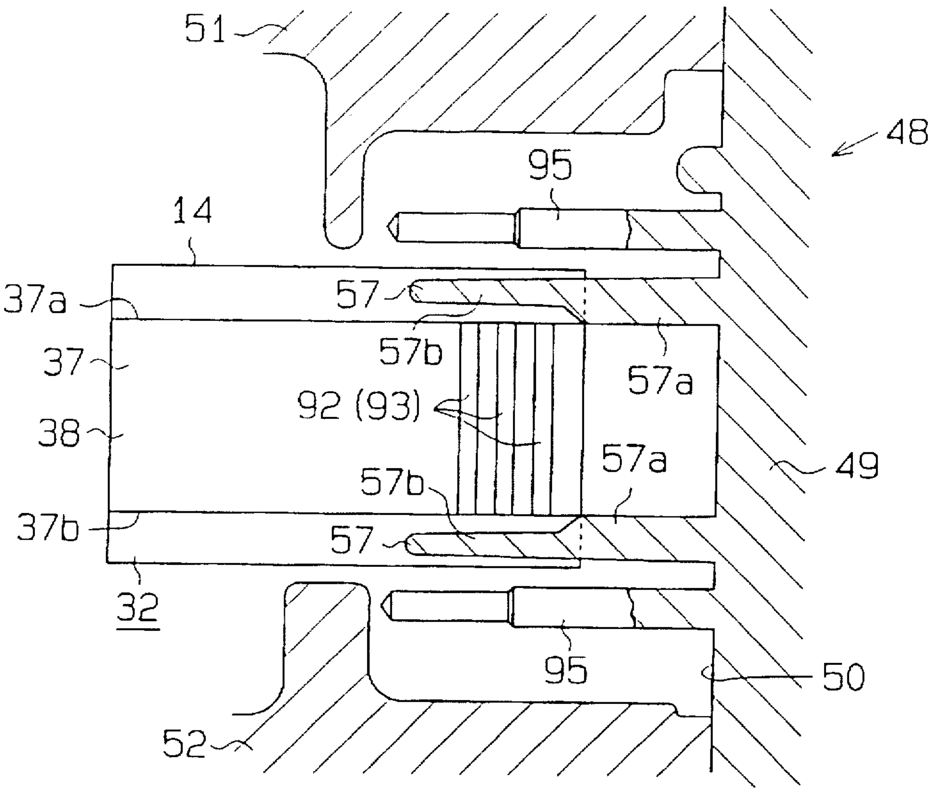
FIG. 26 is a cross-sectional view showing where connecting portions of the liner assembly are fitted halfway onto protrusions of a die.

(c) A comparatively large force is necessary for press fitting the connecting portion 37 into the thick portion 57*a* in FIG. 26. The motion of the side movable mold 53 is utilized for this press fitting when the mold 48 is closed. Thus, if each cylinder liner 31 (32) is put over the corresponding core pin 94 prior to the press fitting, the liner assembly 14 will be automatically arranged in the position shown in FIG. 27 nearly at the time the mold closes. There is no need for providing an additional mechanism in order to press fit the connecting portion into the thick portion 57*a*.

(d) Because a cutting operation is not performed for forming the interbore cooling water passage 17, there is no occurrence of swarf, flash, burr, or the like. The risk that the swarf will get into the interbore cooling water passage 17 and reduce the cross section and the flow of the cooling water is thus reduced.

Note that the present invention can be embodied in the following manner:

(1) The material of the cylinder liners 31 through 34 may also be cast iron or alloyed cast iron. In this case, the cylinder liner is formed by casting. The recess portion, the tongue, and the groove are roughly formed at the time of casting, and then they are finished by mechanical cutting.

(2) The manufacturing method of the present invention is not limited to a cylinder block with four cylinders. The invention is applicable to a cylinder block having two or more cylinders.

(3) Instead of the holes 23 and 24 of the first, second, third, and fourth embodiments, pins for forming the communicating portions may be arranged in the mold prior to casting. When the mold is opened, the pins are pulled out from the cast body. If such operation is performed, the spaces generated by the pulling-out of the pins can be used as the communicating portions. In this case, a drilling operation is unnecessary.

(4) During casting, the heat of the molten metal is transferred to the liner assembly 14. If an adhesive is used as the bonding structure of the connecting portions 35, 37, and 39, as described in the second embodiment, the adhesive is required to have heat resistance. Particularly, because the heat is transferred from the circumference of the connecting portion 35 (37 and 39) toward the central portion, the temperature of the adhesive will become high if the adhesive agent is applied in a rectangular shape along the peripheral margin of the joining surface 36 (38 and 41) as in the case of the second embodiment. Therefore, depending upon the kind of the adhesive, that is, in the case where the heat resistance of the adhesive agent is not sufficiently high, it is desirable that the location at which the adhesive agent is applied be changed appropriately.

For example, as shown by two-dot chain lines in FIG. 15, a groove 68 may be formed in the central portion of the joining surface 38 (36 and 41), and an adhesive agent may be applied to this groove to bond the connecting portions 35 and 37 (39) together. If done like this, the influence of heat on the adhesive is reduced during casting.

(5) The following method may be adopted for interconnecting the cylinder liners 31 through 34 and forming the liner assembly 14.

The joining surfaces 36, 38, and 41 of adjacent cylinder liners 31 through 34 are first contacted with each other, and then the outer peripheral portion of each contacted portion are welded.

Figure 30:
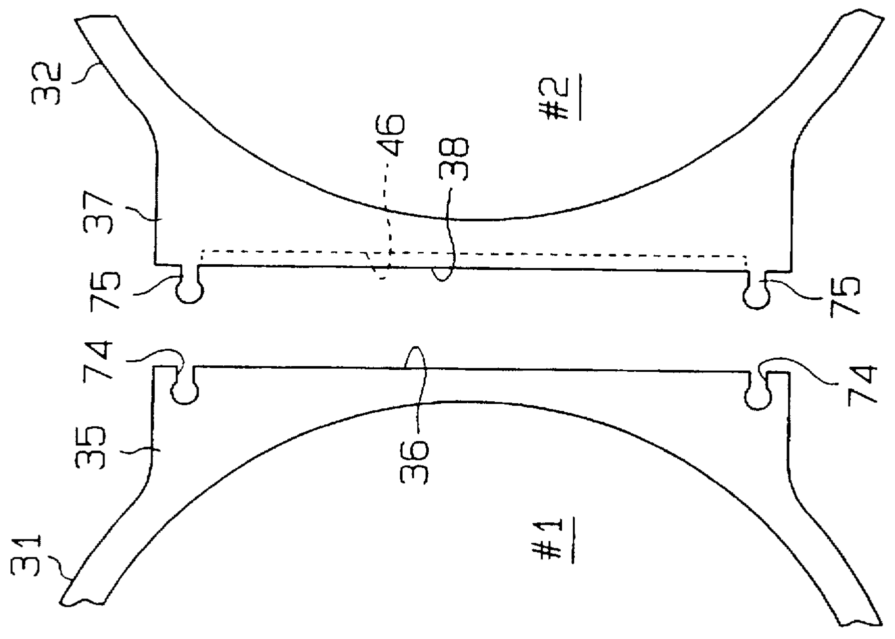
FIG. 30 is a partial plan view showing another example of cylinder liner connecting structure.

Also, as shown in FIG. 30, on the side portions of the joining surface, a pair of key grooves 74 may be formed over the entire length of the cylinder liner 31, and also on the side portions of the joining surface 38, a key 75 may be formed along the entire length of the cylinder liner 32. In this case, the key 75 is inserted into the key groove 74 by sliding either the cylinder liner 31 or 32 in the axial direction of the bores. Then, the cylinder liners 31 and 32 will be interconnected.

Figure 31:
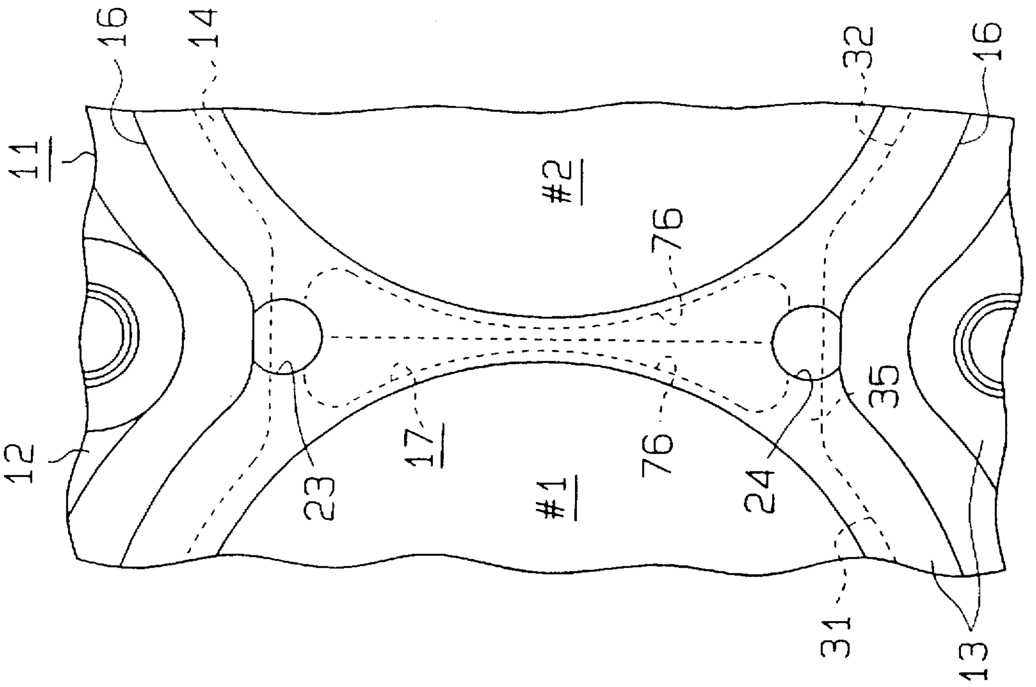
FIG. 31 is a partial plan view showing another example of interbore cooling water passages.

(6) The shape of the recess portion constituting the interbore cooling water passage 17 may be appropriately changed. For example, as shown in FIG. 31, a recess portion 76 may be made more shallow where the distance between adjacent cylinder bores #1 and #2 is the smallest, and the recess portion may be made deeper as it comes closer to the water jacket 16. With this structure, the cooling effect can be improved because the volume of the interbore cooling water passage 17 is enlarged compared with the case where the depth of the recess portions 46 and 47 is constant throughout as in the first embodiment.

Figure 32:
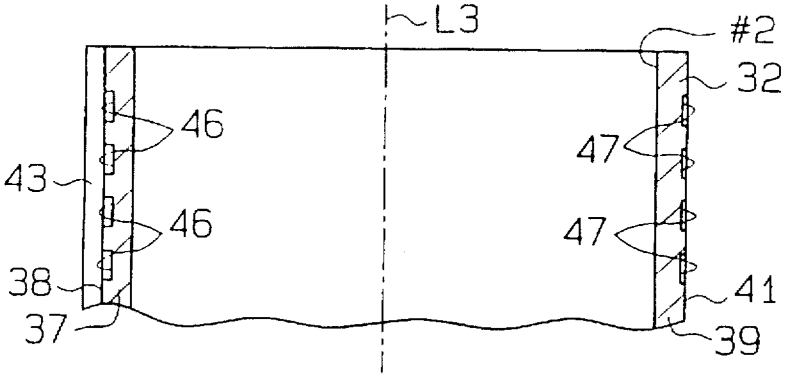
FIG. 32 is a partial cross-sectional view corresponding to FIG. 2 of a further example.
Figure 33:
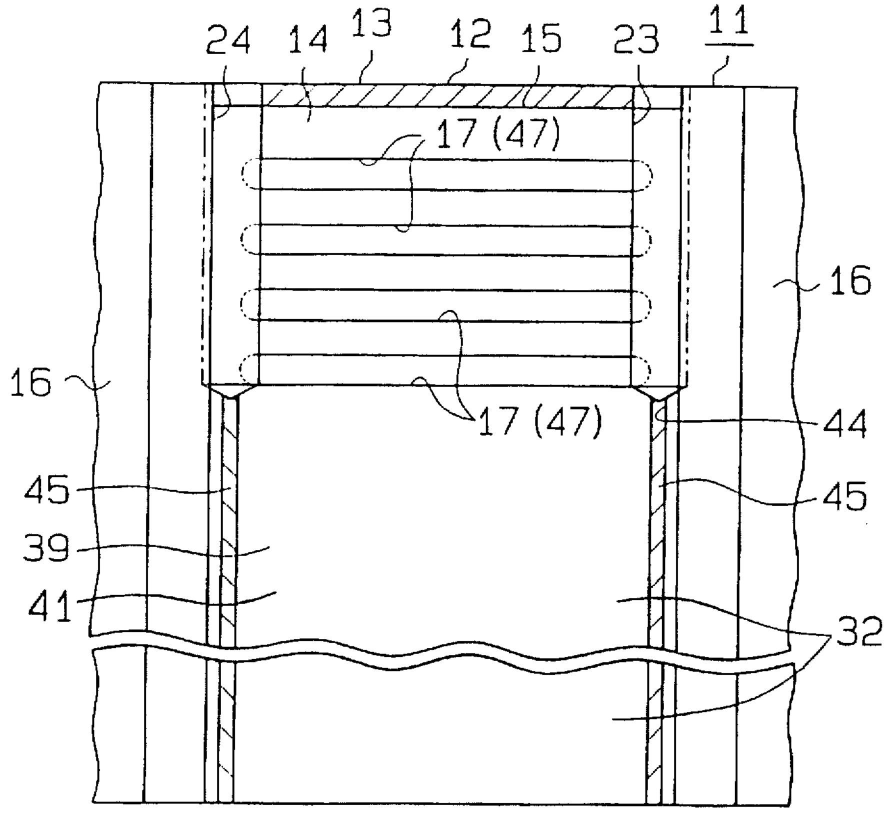
FIG. 33 is a partial cross-sectional view corresponding to FIG. 13 of a further example.
Figure 35:
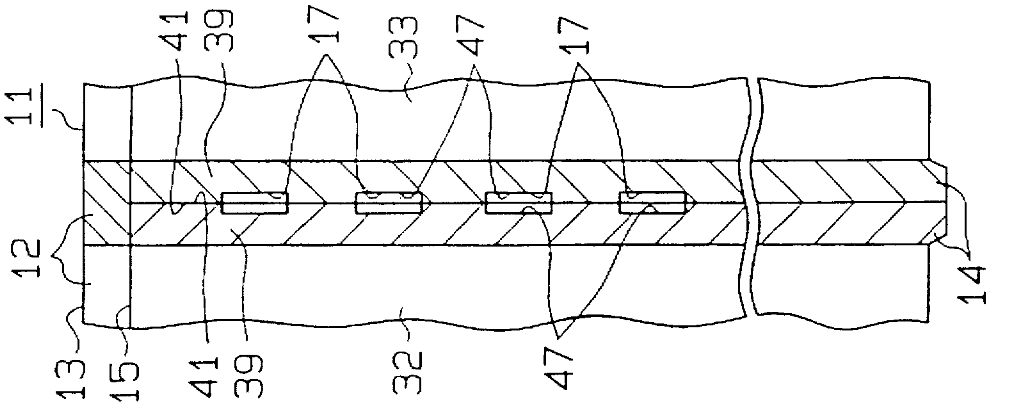
FIG. 35 is a partial cross-sectional view corresponding to FIG. 11 showing a further example.
Figure 34:
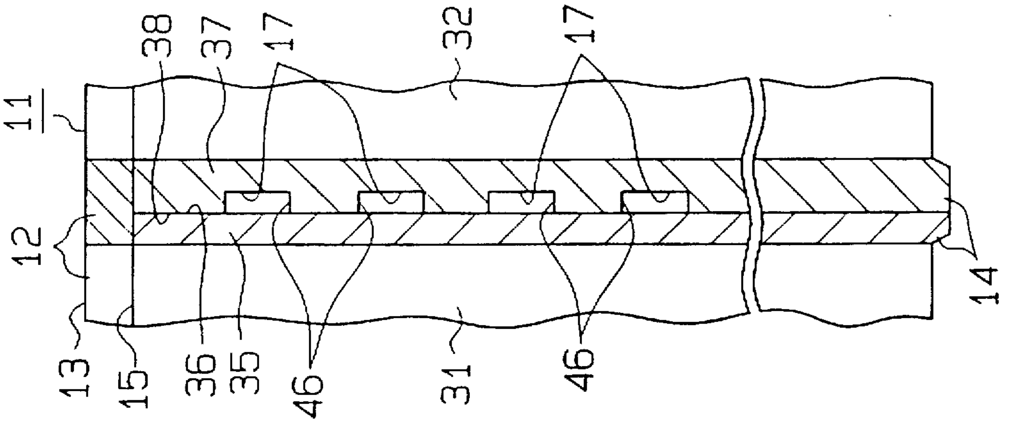
FIG. 34 is a partial cross-sectional view corresponding to FIG. 10 showing a further example.

In addition, the recess portions 46 and 47 may be constituted by a plurality of grooves extending in a direction perpendicular to the axis L3 of the cylinder liner. In FIGS. 32 and 33, four recess portions 46 and 47 extending perpendicular to the direction of the axis L3 of the second cylinder liner 32 are shown as an example. In a case where the liner assembly 14 is constituted by two kinds of cylinder liners with different shapes, cylinder liners 31 and 34 and cylinder liners 32 and 33, the recess portions 46 are provided in the joining surface 38 of the second cylinder liner 32 (third cylinder liner 33) and are not provided in the joining surface 36 of the first cylinder liner 31 (fourth cylinder liner 34), as shown in FIG. 34. As shown in FIG. 35, the recess portions 47 are provided in the joining surfaces 41 of the second and third cylinder liners 32 and 33. If the recess portions 46 and 47 are thus constituted by a plurality of grooves, the bonding rigidity of the cylinder liners 31 through 34 is enhanced and the rigidity of the portions between bores is enhanced.

Note that the number of the recess portions 46 and 47 may be properly selected as desired. Also, the recess portions 46 and 47 may be changed as long as they cross the direction of the axis L3 of the cylinder liner, and the recess portions may obliquely cross the direction of the axis L3. The recess portions 46 and 47 may be formed into a nonlinear shape. For example, the recess portions may have a curved portion. Furthermore, adjacent recess portions 46 and 47 need not be parallel with each other.

(7) The resistance of the flow of the cooling water 19 can be suitably set by varying the size of the communicating passages between the water jacket 16 and the closed spaces 21 and 22 by changing the depth of the holes 23 and 24.

(8) The tongues 43 and 45 in the first embodiment may be changed to grooves and the grooves 42 and 44 may be changed to tongues. Even with such structure, only two kinds of cylinder liners, 31 and 34 and 32 and 33, would be needed as in the first embodiment.

(9) In a case where the liner assembly 14 has sufficiently high strength and is not deformed by the heat of molten metal when molten metal is injected, the core mechanism used in the first embodiment may be omitted.

(10) In the above embodiments, the material of the block body 12 is different from the material of the cylinder liners 31 through 34. If the linear expansion coefficients of these material differ, there will be some cases where a very small gap will occur in the boundary portion between the block main body 12 and the cylinder liners 31 through 34 due to the heat generated by the operation of the engine. In order to prevent the block body 12 and the cylinder liners 31 through 34 from sliding because of this gap, it is preferred to make the outer peripheral surfaces rough.

For example, in a case where the cylinder liners 31 through 34 are made by extrusion, a plurality of grooves or tongues are formed along the direction of the extrusion when the extrusion is performed. Also, in a case where the cylinder liners 31 through 34 are made by casting, a plurality of first grooves (or first tongues) and second grooves (or second tongues) extending in different directions are formed along the outer peripheral surfaces of the liners.

(11) Providing spaces in the fittings of the cylinder liners for allowing molten metal to get into the spaces is applicable to a cylinder block 11 of the type where clamping tongues 80 and 81 and a groove 84 are not provided as in the first embodiment. In this case, the depth H1 of the groove 42 in FIG. 3 is made greater than the height H2 of the tongue 43 by 0.2 mm or more ($H1 \geqq H2+0.2$). With such structure, a single space through which molten metal can flow will be generated between the inner bottom surface of the groove 42 and the distal end surface of the tongue 43 when the tongue 43 is press fitted into the groove 42. If molten metal is injected and filled in this space, leakage of the cooling water 19 can be prevented as in the case of the fourth embodiment.

(12) The shape of the fitting portion 87 and the number or shape of the spaces 88 and 89 are not limited to those described in the fourth embodiment and various changes are possible.

(13) In the fourth embodiment, the process of supplying molten metal into the spaces 88 and 89 may be performed between the formation process of the liner assembly 14 and the formation process of the communicating portions (holes 23 and 24). Therefore, molten metal may be separately supplied into the spaces 88 and 89 without using the molten metal that is injected for molding the cast body 62. In this case, the metal material for molding the cast body may differ from the metal material that is filled in the spaces 88 and 89.

(14) In the fifth embodiment, the groove 92 is formed only in the connecting portion 37 of the second liner 32 as a recess portion. However, the groove 92 may be formed only in the connecting portion 35 of the first cylinder liner 31, or grooves 92 may be provided in both connecting portions 35 and 37.

(15) In the fifth embodiment, the requirement for the through passage 93 is only that the opposite ends of the through passage 93 are open at the opposite side surfaces **37*a* and 37*b* of the connecting portion 37. Therefore, points other than that can be suitably changed. For example, the number of the through holes 93 may be changed to less than 3 or more than 3. In addition, each through passage 93 may obliquely cross the axis L3 of the cylinder liner 31 (32). Furthermore, the depth of the through hole 93** may vary.

(16) The upper end of the liner is not exposed on the upper surface of the block with regard to the sealing of the head gasket. However, if a head gasket with a shim is used, the head gasket may be received by the upper surface of the liner in a case where the surface pressure is high or where the temperature of the upper surface of the block is high. In the above environments, improved sealing is achieved by the exposed liner because the liner material has higher surface pressure at high temperature than the block material.

(17) The material of the liner may be cast-iron, cast-iron alloy or MMC (metal matrix composite).

(18) The liner may not have a double-layer structure.

What is claimed is:

1. A method for producing a cylinder block for an internal combustion engine having a sealing surface on which a gasket is mounted, a plurality of cylinder bores arranged side by side, and each cylinder bore opening to said sealing surface, a water jacket surrounding said cylinder bores, and a cooling passage located between the cylinder bores, said method comprising the steps of:

providing a plurality of cylinder liners, each having one of said plurality of cylinder bores and at least one connecting portion;

forming a liner assembly by joining said cylinder liners with each other at their connecting portions, at least one of their connecting portions having a recess that forms a space located between the cylinder bores when the connecting portions are joined;

positioning the liner assembly in a mold; and molding a cast body having said water jacket around said liner assembly by pouring molten metal into the mold, wherein said space is blocked to prevent said molten metal from entering the space during molding.

2. The method according to claim 1 further comprising the step of connecting said space with said water jacket to form the cooling passage.

3. The method according to claim 2, wherein each space is blocked during the step of forming said liner assembly.

4. The method according to claim 2, wherein each space is blocked by a part of said mold when said liner assembly is positioned in said mold.

5. A method for producing a cylinder block for an internal combustion engine having a sealing surface on which a gasket is mounted, a plurality of cylinder bores arranged side by side, each cylinder bore opening to said sealing surface, a water jacket surrounding said plurality of cylinder bores, and a cooling passage located between the cylinder bores, said method comprising the steps of:

providing a plurality of cylinder liners, each having one of said plurality of cylinder bores and at least one connecting portion;

forming a liner assembly by joining said cylinder liners with each other at their connecting portions, at least one of the connecting portions having a recess that forms a closed space located between the cylinder bores when the connecting portions are joined;

positioning the liner assembly in a mold;

molding a cast body having said water jacket around said liner assembly by pouring molten metal into the mold; and forming a communicating passage that communicates said closed space to said water jacket to form the cooling passage.

6. The method according to claim 5, wherein said communicating passage includes a plurality of holes that extend parallel to axes of said cylinder bores.

7. The method according to claim 5, wherein said closed space is located near a part of the cylinder block that is heated to a high temperature relative to the remaining part of the cylinder block when the engine is operated.

8. The method according to claim 5, wherein the depth of said recess is set depending on the location of the cylinder liner in which the recess is formed in said liner assembly.

9. The method according to claim 5, wherein each cylinder liner has a plurality of fittings provided at its connecting section;

wherein each fitting engages with an associated one of the fittings of an adjacent one of the liners to form a space in the vicinity of said fittings for allowing said molten metal to enter therein; and wherein said method further includes the step of filling said spaces with said molten metal between the step of forming said liner assembly and the step of forming said communicating passage.

10. The method according to claim 9, wherein said space extends longitudinally along said cylinder liner and has a minimum width of greater than 0.2 mm.

11. The method according to claim 5, wherein each connecting portion has a flat joining surface, wherein one of the joining surfaces has a groove and another joining surface has a tongue that corresponds to said groove, and wherein said step of forming said liner assembly includes press fitting said tongue into said groove and thus joining the joining surfaces of an adjacent pair of said liners.

12. The method according to claim 5, wherein each connecting portion has a flat joining surface, wherein at least one of the joining surfaces has a groove for receiving an adhesive, and wherein said step of forming said liner assembly includes supplying said adhesive into said groove and adhering the joining surfaces of an adjacent pair of said liners by said adhesive.

13. The method according to claim 12, wherein said groove is located at a center section of said one of the joining surfaces.

14. The method according to claim 5, wherein each connecting portion has a flat joining surface, and wherein said step of forming said liner assembly includes arranging said cylinder liners side by side within said mold and joining the joining surfaces by compressing said cylinder liners from opposite directions with pins.

15. The method according to claim 9, wherein one of the fittings includes a groove extending along the connecting portion and the other includes a tongue extending along the connecting portion, wherein said space is formed when said tongue engages with the groove.

16. The method according to claim 9, wherein some of said molten metal is supplied to said space in the step of molding said body.

17. A method for producing a cylinder block for an internal combustion engine having a sealing surface on which a gasket is mounted, a plurality of cylinder bores arranged side by side, and each cylinder bore opening to said sealing surface, a water jacket surrounding said cylinder bores, and a cooling passage located between the cylinder bores, said method comprising the steps of:

providing a plurality of cylinder liners, each having one of said plurality of cylinder bores and at least one connecting portion;

forming a liner assembly by joining said cylinder liners with each other at their connecting portions, at least one of the connecting portions having a plurality of grooves that form said cooling passages when the connecting portions are joined, each groove having two opposite open ends;

positioning said liner assembly in a mold and blocking said opposite ends of each groove by part of said mold;

molding a cast body by pouring molten metal into said mold and solidifying said molten metal; and removing the solidified cast body from said mold, the resulting cast body having said water jacket and said cooling passages communicating with to said water jacket.

18. The method according to claim 17, wherein said step of positioning said liner assembly includes fit pressing each connecting portion into a projected section of said mold for forming said water jacket.

19. The method according to claim 18, wherein said mold includes a fixed mold part and a plurality of movable mold parts, wherein said step of positioning said liner assembly includes pressing said liner assembly against said fixed mold part by one of said movable mold parts when said mold is closed.

20. The method according to claim 17, wherein said grooves are provided near a part of the cylinder block that is heated to a high temperature relative to the remaining part of the cylinder block when the engine is operated.

21. The method according to claim 17, wherein said grooves extend in a direction transverse to the axes of the cylinder bores.

* * * * *

UNITED STATES PATENT AND TRADEMARK OFFICE

CERTIFICATE OF CORRECTION

PATENT NO. : 5,755,028

DATED : May 26, 1998

INVENTOR(S) : Toshihiro Takami, et. al.

It is certified that error appears in the above-identified patent and that said Letters Patent is hereby corrected as shown below:

| Column | Line | |
|---|---|---|
| 13 | 14 | Change "and **23**" to --and **24**--. |
| 17 | 8 | After "surface" delete "**13**"; after "area" insert --**13**--. |
| 19 | 40 | Change "material" to --materials--. |
| 22 | 42 | Change "with to said" to --with said--. |

Signed and Sealed this

Sixth Day of April, 1999

*Attest:*

Q. TODD DICKINSON

*Attesting Officer*

*Acting Commissioner of Patents and Trademarks*